US009845433B2

(12) United States Patent
Yanagawa et al.

(10) Patent No.: US 9,845,433 B2
(45) Date of Patent: Dec. 19, 2017

(54) METHOD FOR PRODUCING OLEFINS AND MONOCYCLIC AROMATIC HYDROCARBONS BY A COMBINATION OF STEAM CRACKING, DICYCLOPENTADIENE REDUCTION, AND CRACKING AND REFORMING

(71) Applicant: JX Nippon Oil & Energy Corporation, Tokyo (JP)

(72) Inventors: Shinichiro Yanagawa, Tokyo (JP); Masahide Kobayashi, Tokyo (JP); Yukihiro Yoshiwara, Tokyo (JP); Ryoji Ida, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 257 days.

(21) Appl. No.: 14/437,298

(22) PCT Filed: Oct. 25, 2013

(86) PCT No.: PCT/JP2013/079043
§ 371 (c)(1),
(2) Date: Apr. 21, 2015

(87) PCT Pub. No.: WO2014/065421
PCT Pub. Date: May 1, 2014

(65) Prior Publication Data
US 2015/0275103 A1 Oct. 1, 2015

(30) Foreign Application Priority Data

Oct. 25, 2012 (JP) ................................ 2012-236133

(51) Int. Cl.
*C10G 11/05* (2006.01)
*B01J 19/24* (2006.01)
(Continued)

(52) U.S. Cl.
CPC ................. *C10G 11/05* (2013.01); *B01J 8/02* (2013.01); *C10G 35/04* (2013.01); *C10G 35/095* (2013.01);
(Continued)

(58) Field of Classification Search
CPC ........ C10G 11/05; C10G 69/06; C10G 63/04; C10G 35/095; C10G 69/04; C10G 69/08;
(Continued)

(56) References Cited

U.S. PATENT DOCUMENTS 3,007,978 A * 11/1961 Beach ........................ C07C 4/22
585/354
3,260,765 A 7/1966 Asselin
(Continued)

FOREIGN PATENT DOCUMENTS

JP 2003510419 A 3/2003
JP 2012062356 A 3/2012
(Continued)

OTHER PUBLICATIONS

Office Action and Search Report (and English translation of Search Report) dated Nov. 9, 2015 in CN Application No. 201380055306.0.
(Continued)

*Primary Examiner* — In Suk Bullock
*Assistant Examiner* — Ali Z Fadhel
(74) *Attorney, Agent, or Firm* — Panitch Schwarze Belisario & Nadel LLP

(57) ABSTRACT

A method for producing an olefin and a monocyclic aromatic hydrocarbon of the present invention includes a dicyclopentadiene removal treatment step of removing dicyclopentadienes having a dicyclopentadiene skeleton from a feedstock oil which is a thermally-cracked heavy oil obtained from an apparatus for producing ethylene and which has a 90 volume % distillate temperature, as a distillation characteristic, of
(Continued)

390° C. or lower; and a cracking and reforming reaction step of obtaining a product containing an olefin and a monocyclic aromatic hydrocarbon by bringing the feedstock oil having a content of dicyclopentadienes adjusted to 10% by weight or less by treating a part or all of the feedstock oil through the dicyclopentadiene removal step into contact with a catalyst and reacting the feedstock oil.

7 Claims, 2 Drawing Sheets

(51) Int. Cl.
| | | |
|---|---|---|
| C10G 69/04 | (2006.01) | |
| C10G 35/04 | (2006.01) | |
| B01J 8/02 | (2006.01) | |
| C10G 35/095 | (2006.01) | |
| C10G 63/04 | (2006.01) | |
| C10G 69/06 | (2006.01) | |
| C10G 69/08 | (2006.01) | |

(52) U.S. Cl.
CPC ............ *C10G 63/04* (2013.01); *C10G 69/04* (2013.01); *C10G 69/06* (2013.01); *C10G 69/08* (2013.01); *B01J 2208/027* (2013.01); *C10G 2300/1051* (2013.01); *C10G 2300/1055* (2013.01); *C10G 2400/20* (2013.01); *C10G 2400/22* (2013.01); *C10G 2400/30* (2013.01); *Y02P 20/132* (2015.11)

(58) Field of Classification Search
CPC ............ C10G 35/04; C10G 2300/1051; C10G 2400/30; C10G 2400/22; C10G 2400/20; C10G 2300/1055; B01J 19/245; B01J 2219/24
See application file for complete search history.

(56) References Cited

U.S. PATENT DOCUMENTS

| 4,585,545 | A | * | 4/1986 | Yancey, Jr. ............ C10G 45/48 208/56 |
| --- | --- | --- | --- | --- |
| 5,981,418 | A | * | 11/1999 | Drake .................... B01J 29/061 502/60 |
| 2004/0049093 | A1 | | 3/2004 | Cheung et al. |
| 2006/0260981 | A1 | * | 11/2006 | Gosling ................. C10G 11/05 208/59 |
| 2008/0051615 | A1 | * | 2/2008 | Stavens .................. B01J 29/126 585/266 |
| 2008/0146855 | A1 | * | 6/2008 | Negiz ...................... B01J 23/58 585/275 |
| 2010/0087692 | A1 | * | 4/2010 | Yoshimura ............... C10G 9/00 585/252 |
| 2011/0207979 | A1 | * | 8/2011 | Kim ........................ C10G 11/02 585/256 |
| 2012/0168348 | A1 | * | 7/2012 | Coleman ................ C10G 11/20 208/80 |
| 2013/0087482 | A1 | * | 4/2013 | Haizmann ............ C10G 35/085 208/64 |
| 2013/0172639 | A1 | | 7/2013 | Yanagawa et al. |
| 2013/0184506 | A1 | | 7/2013 | Yanagawa et al. |

FOREIGN PATENT DOCUMENTS

| WO | 0012450 | A1 | 3/2000 |
| --- | --- | --- | --- |
| WO | 0123332 | A1 | 4/2001 |
| WO | 2006137615 | A1 | 12/2006 |
| WO | 2012036182 | A1 | 3/2012 |
| WO | 2012036186 | A1 | 3/2012 |

OTHER PUBLICATIONS

International Search Report dated Jan. 28, 2014 in International Application No. PCT/JP2013/079043.
"Petrochemical Process," The Japan Petroleum Institute, Kodansha Ltd., pp. 21-30 (Aug. 10, 2001).
Extended European Search Report dated Jun. 10, 2016 in EP Application No. 13848151.0.

* cited by examiner

METHOD FOR PRODUCING OLEFINS AND MONOCYCLIC AROMATIC HYDROCARBONS BY A COMBINATION OF STEAM CRACKING, DICYCLOPENTADIENE REDUCTION, AND CRACKING AND REFORMING

CROSS-REFERENCE TO RELATED APPLICATION

This application is a Section 371 of International Application No. PCT/JP2013/079043, filed Oct. 25, 2013, which was published in the Japanese language on May 1, 2014, under International Publication No. WO 2014/065421 A1, the disclosure of which is incorporated herein by reference.

TECHNICAL FIELD

The present invention relates to a method for producing an olefin and a monocyclic aromatic hydrocarbon and an apparatus for producing ethylene and, particularly, to a method for producing an olefin having 2 to 4 carbon atoms and a monocyclic aromatic hydrocarbon having 6 to 8 carbon atoms and an apparatus for producing ethylene.

Priority is claimed on Japanese Patent Application No. 2012-236133, filed Oct. 25, 2012, the content of which is incorporated herein by reference.

BACKGROUND ART

Oil containing a polycyclic aromatic component such as light cycle oil (hereinafter, abbreviated as "LCO") which is a cracked light oil produced in a fluid catalytic cracking (hereinafter, abbreviated as "FCC") apparatus has so far been used mainly as a light oil or heavy oil-oriented fuel base material. In recent years, a technique has been proposed that efficiently produces a monocyclic aromatic hydrocarbon having 6 to 8 carbon atoms which can be used as a high octane gasoline base material or a petrochemical feedstock and has a high added value (for example, benzene, toluene, or coarse xylene; hereinafter, these will be collectively referred to as "BTX") from a feedstock containing a polycyclic aromatic component.

In addition, as an application of the method for producing BTX from a feedstock containing a polycyclic aromatic component, another method has been proposed for producing an aromatic hydrocarbon in which BTX is produced from a thermally-cracked heavy oil obtained from an apparatus for producing ethylene (for example, refer to PTL 1).

In the method for producing an aromatic hydrocarbon according to PTL 1, compared with the thermally-cracked heavy oil in the related art which has been mostly used as a fuel or the like for a boiler or the like in industrial complexes, the thermally-cracked heavy oil is hydrogenated, is brought into contact with a catalyst for producing an olefin and a monocyclic aromatic hydrocarbon, and is reacted, thereby producing BTX.

CITATION LIST

Patent Literature

[PTL 1] Japanese Unexamined Patent Application, First Publication No. 2012-062356

Non-Patent Literature

[NPL 1] "Petrochemical Process" edited by The Japan Petroleum Institute and published by Kodansha Ltd., Aug. 10, 2001, pp. 21 to 30

SUMMARY OF INVENTION

Technical Problem

Olefins such as ethylene or propylene produced using an apparatus for producing ethylene are, similar to BTX, highly valuable in an industrial sense and there is a demand for an increase in the production efficiency of the olefins with the apparatus for producing ethylene.

Therefore, even in the method for producing an aromatic hydrocarbon of PTL 1, there is a demand for an increase in the yield of an olefin as well as an increase in the yield of BTX.

The present invention has been made in consideration of the above-described circumstances and an object thereof is to provide a method for producing an olefin and a monocyclic aromatic hydrocarbon which enables the production of BTX from an apparatus for producing ethylene with high production efficiency and enables the efficient production of an olefin as well and an apparatus for producing ethylene.

Solution to Problem

As a result of the repetition of thorough studies to achieve the object, the present inventors found that, when BTX is produced from a thermally-cracked heavy oil through a cracking and reforming reaction, particularly, dicyclopentadienes (all compounds having an olefin portion in a dicyclopentadiene skeleton and multimeric complexes of an arbitrarily combination of cyclopentadiene or alkyl cyclopentadiene, for example, multimeric complexes such as dimers of methyl cyclopentadiene, dimers of cyclopentadiene and methyl cyclopentadiene, trimers or higher oligomers of cyclopentadiene, hereinafter, collectively referred to as DCPDs) act as catalyst poisons that deteriorate the activity of a catalyst for producing a monocyclic aromatic hydrocarbon that is used for the cracking and reforming reaction. In addition, as a result of carrying out additional studies on the basis of the finding, the present invention was completed.

That is, a method for producing an olefin and a monocyclic aromatic hydrocarbon of the present invention includes a dicyclopentadiene removal treatment step of removing dicyclopentadienes having a dicyclopentadiene skeleton from a part or all of a feedstock oil which is a thermally-cracked heavy oil obtained from an apparatus for producing ethylene and which has a 90 volume % distillate temperature, as a distillation characteristic, of 390° C. or lower; and a cracking and reforming reaction step of obtaining a product containing an olefin having 2 to 4 carbon atoms and a monocyclic aromatic hydrocarbon having 6 to 8 carbon atoms by bringing the feedstock oil having a content of the dicyclopentadienes adjusted to 10% by weight or less by treating a part or all of the feedstock oil through the dicyclopentadiene removal step into contact with a catalyst for producing an olefin and a monocyclic aromatic hydrocarbon containing crystalline aluminosilicate and reacting the feedstock oil.

In addition, the production method preferably further includes, before the cracking and reforming reaction step, a hydrogenation reaction step of partially hydrogenating part or all of the feedstock oil.

In addition, in the dicyclopentadiene removal treatment step, the feedstock oil having a content of the dicyclopentadienes adjusted to 12% by weight or less is preferably supplied to the hydrogenation reaction step.

In addition, in the production method, in the hydrogenation reaction step, it is preferable that, as hydrogenation conditions for hydrogenating the feedstock oil, a hydrogen partial pressure be set in a range of 1 MPa to 9 MPa, a hydrogenation temperature be set in a range of 150° C. to 400° C., and, as a hydrogenation catalyst, a catalyst obtained by supporting at least one metal selected from Group 6 metals in the periodic table in a range of 10% by mass to 30% by mass and at least one metal selected from Groups 8 to 10 metals in the periodic table in a range of 1% by mass to 7% by mass on an inorganic carrier containing aluminum oxide, based on the total mass of the catalyst be used.

In addition, the production method preferably includes a recycling step of returning a heavy fraction having 9 or more carbon atoms from the product obtained in the cracking and reforming reaction step to the cracking and reforming reaction step.

In addition, in the production method, in the cracking and reforming reaction step, it is preferable that two or more fixed-bed reactors be used and a cracking and reforming reaction and reproduction of the catalyst for producing an olefin and a monocyclic aromatic hydrocarbon be alternately or sequentially repeated while the reactors are periodically switched.

In addition, in the production method, the crystalline aluminosilicate contained in the catalyst for producing an olefin and a monocyclic aromatic hydrocarbon used in the cracking and reforming reaction step preferably includes a medium-pore zeolite and/or a large-pore zeolite as a main component.

In addition, in the production method, the catalyst for producing an olefin and a monocyclic aromatic hydrocarbon used in the cracking and reforming reaction step preferably contains phosphorous.

An apparatus for producing ethylene of the present invention includes a cracking furnace;

a product collection device that separates and collects hydrogen, ethylene, propylene, a C4 fraction, and a fraction containing a monocyclic aromatic hydrocarbon having 6 to 8 carbon atoms respectively from a cracked product produced in the cracking furnace;

a dicyclopentadiene removal device in which an oil which is a thermally-cracked heavy oil obtained in the cracking furnace and has a 90 volume % distillate temperature, as a distillation characteristic, of 390° C. or lower is used as a feedstock oil and dicyclopentadienes having a dicyclopentadiene skeleton are removed from a part or all of the feedstock oil; and a cracking and reforming reaction device in which the feedstock oil having an amount of the dicyclopentadienes adjusted by treating a part or all of the feedstock oil using the dicyclopentadiene removal device is brought into contact with a catalyst for producing an olefin and a monocyclic aromatic hydrocarbon containing crystalline aluminosilicate and reacting the feedstock oil, thereby obtaining a product containing an olefin having 2 to 4 carbon atoms and a monocyclic aromatic hydrocarbon having 6 to 8 carbon atoms.

In addition, the production apparatus preferably further includes, in front of the cracking and reforming reaction device, a hydrogenation reaction device that partially hydrogenates part or all of the feedstock oil.

In addition, the production apparatus preferably includes recycling means for returning a heavy fraction having 9 or more carbon atoms from the product obtained in the cracking and reforming reaction device to the cracking and reforming reaction device.

In addition, in the production apparatus, it is preferable that the cracking and reforming reaction device include two or more fixed-bed reactors and be configured so as to alternately or sequentially repeat a cracking and reforming reaction and reproduction of the catalyst for producing an olefin and a monocyclic aromatic hydrocarbon while periodically switching the reactors.

Advantageous Effects of Invention

According to the method for producing an olefin and a monocyclic aromatic hydrocarbon and the apparatus for producing ethylene of the present invention, it is possible to produce BTX with higher production efficiency and to efficiently produce an olefin as well.

DESCRIPTION OF EMBODIMENTS

Figure 1:
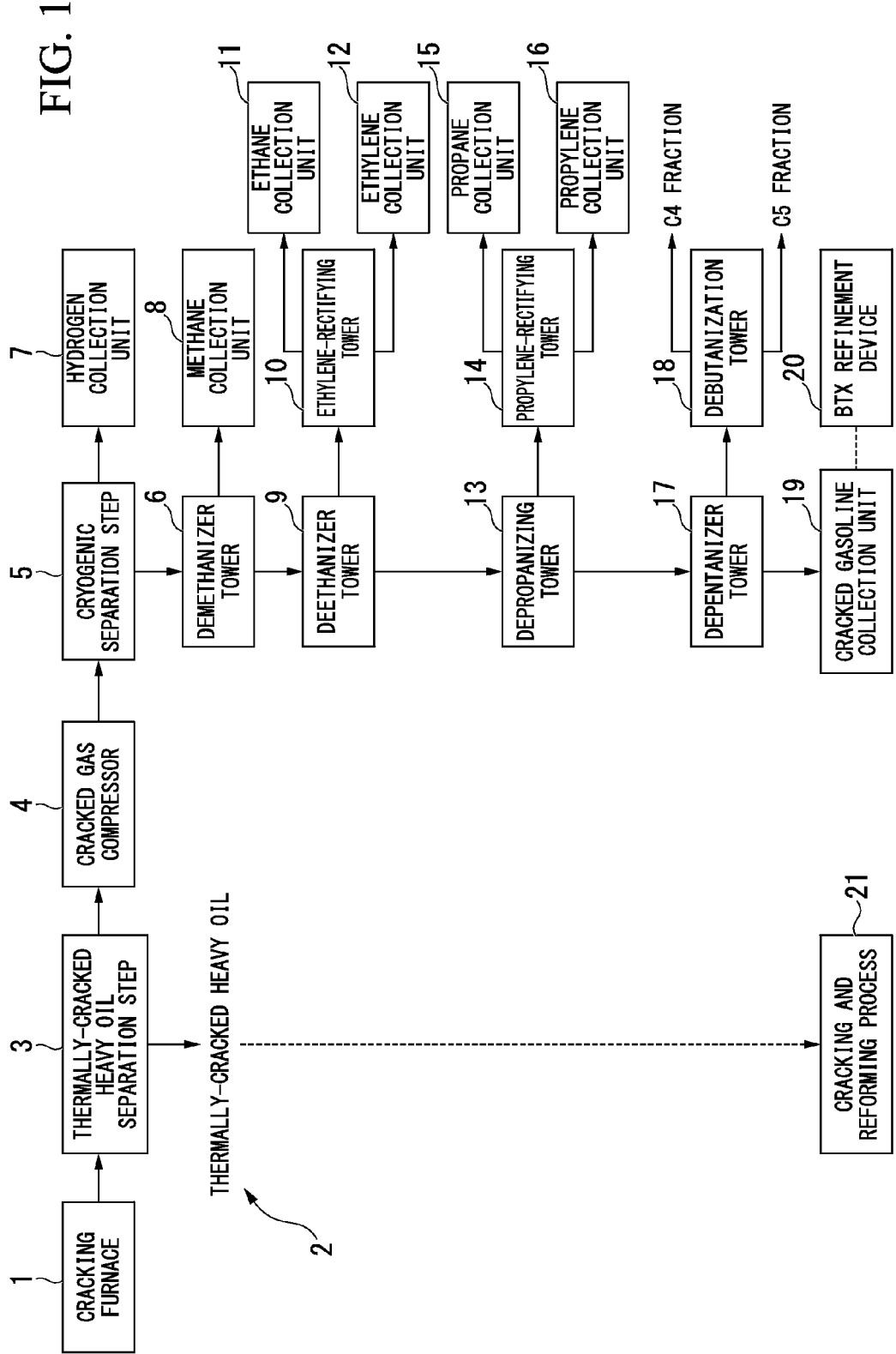
FIG. 1 is a view for illustrating an embodiment of an apparatus for producing ethylene according to the present invention.

Hereinafter, the present invention will be described in detail with reference to the accompanying drawings. FIG. 1 is a view for illustrating an embodiment of an apparatus for producing ethylene according to the present invention and FIG. 2 is a view for illustrating a cracking and reforming process, that is, a new process part of the present application, of the apparatus for producing ethylene illustrated in FIG. 1.

First, the schematic configuration of the embodiment of the apparatus for producing ethylene according to the present invention and a process according to a production method of the present invention will be described with reference to FIG. 1.

Figure 2:
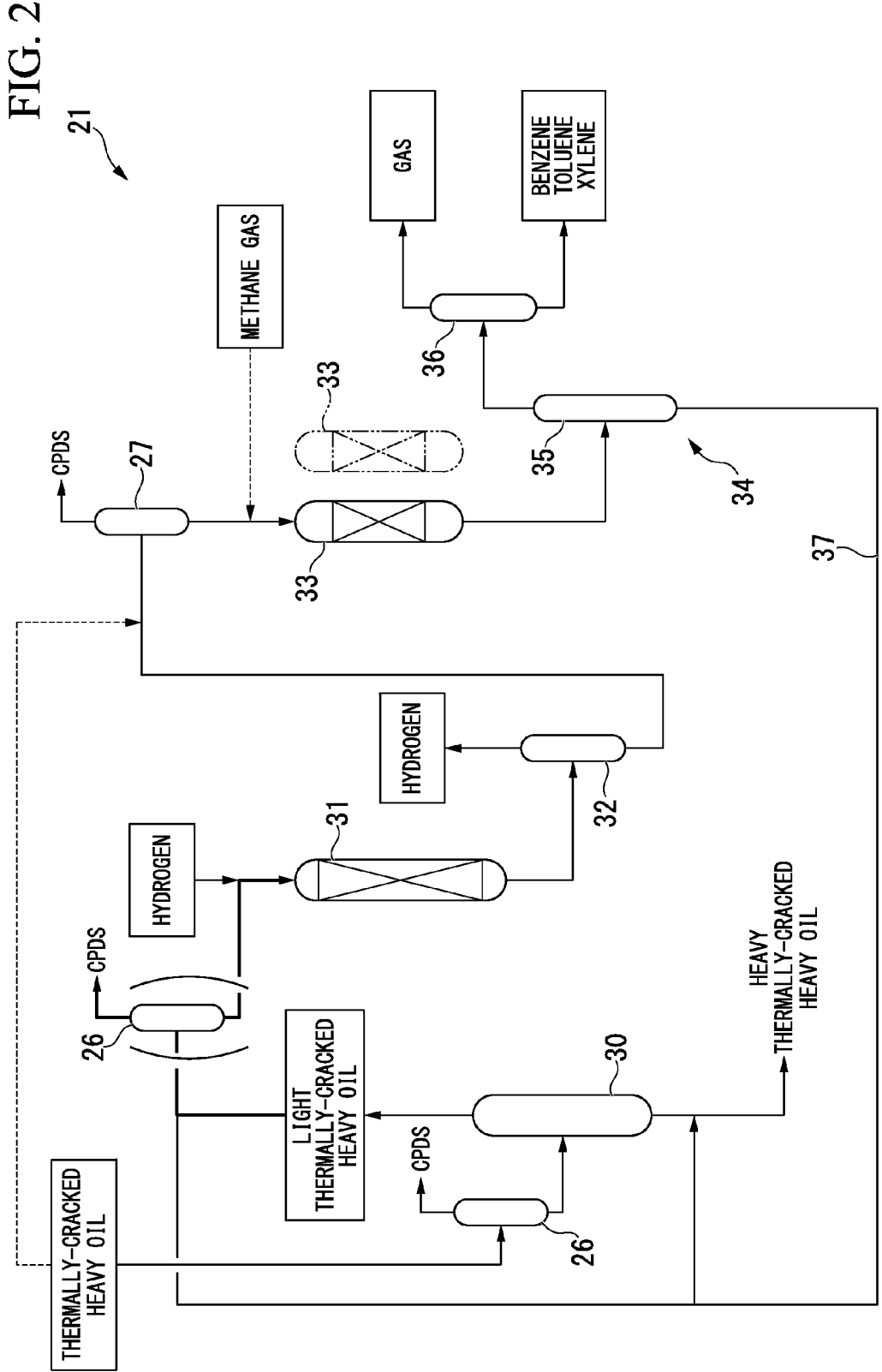
FIG. 2 is a view for illustrating a cracking and reforming process of the apparatus for producing ethylene illustrated in FIG. 1.

In the embodiment of the apparatus for producing ethylene according to the present invention, parts other than the cracking and reforming process illustrated in FIG. 2 may be a well-known apparatus for producing ethylene including a cracking step and a separation and refinement step and the apparatus for producing ethylene described in NPL 1 can be an example thereof. Therefore, an apparatus produced by adding the cracking and reforming process of the present invention to the existing apparatus for producing ethylene is also included in the scope of the embodiment of the apparatus for producing ethylene according to the present invention.

The apparatus for producing ethylene according to the present invention is also called a steam cracker, a steam cracking device, or the like and, as illustrated in FIG. 1, includes a cracking furnace 1 and a product collection device 2 that separates and collects hydrogen, ethylene, propylene, a C4 fraction, and a fraction containing a monocyclic aromatic hydrocarbon having 6 to 8 carbon atoms (BTX fraction: cracked gasoline) respectively from a cracked product produced in the cracking furnace 1.

The cracking furnace 1 thermally cracks feedstocks such as a naphtha fraction, a kerosene fraction, and a light fraction, produces hydrogen, ethylene, propylene, a C4 fraction, and a BTX fraction, and produces a thermally-cracked heavy oil as a residual oil (bottom oil) heavier than the BTX fraction. The thermally-cracked heavy oil is also called a heavy aromatic residue oil (HAR oil) in some cases. The operation conditions of the cracking furnace 1 are not particularly limited and the cracking furnace can be operated under ordinary conditions. For example, diluted water vapor is used as a feedstock and the cracking furnace is operated at a thermal cracking reaction temperature in a range of 770° C. to 850° C. and a retention time (reaction time) in a range of 0.1 seconds to 0.5 seconds. When the thermal cracking temperature is lower than 770° C., cracking does not proceed and a target product cannot be obtained and thus the lower limit of the thermal cracking reaction temperature is more preferably 775° C. or higher and still more preferably 780° C. or higher. On the other hand, when the thermal cracking temperature exceeds 850° C., the amount of gas generated abruptly increases and hindrance is caused in the operation of the cracking furnace 1 and thus the upper limit of the thermal cracking reaction temperature is more preferably 845° C. or lower and still more preferably 840° C. or lower. The steam/feedstock (mass ratio) is desirably in a range of 0.2 to 0.9, more desirably in a range of 0.25 to 0.8, and still more desirably in a range of 0.3 to 0.7. The retention time (reaction time) of the feedstock is more desirably in a range of 0.15 seconds to 0.45 seconds and still more desirably in a range of 0.2 seconds to 0.4 seconds.

The product collection device 2 includes a thermally-cracked heavy oil separation step 3 and further includes individual collection units that separate and collect hydrogen, ethylene, propylene, a C4 fraction, and a fraction containing a monocyclic aromatic hydrocarbon having 6 to 8 carbon atoms respectively.

The thermally-cracked heavy oil separation step 3 is a distillation tower that separates a cracked product obtained in the cracking furnace 1 into a component having a higher boiling point and a component having a lower boiling point on the basis of a specific boiling point before the beginning of main distillation. The lower boiling point component separated in the thermally-cracked heavy oil separation step 3 is extracted in a gas form and is pressurized using a cracked gas compressor 4. The specific boiling point is set so that the target products of the apparatus for producing ethylene, that is, hydrogen, ethylene, propylene, furthermore, a C4 fraction, and cracked gasoline (BTX fraction), are mainly included in the lower boiling point component.

In addition, the higher boiling point component (bottom fraction) separated in the thermally-cracked heavy oil separation step 3 becomes the thermally-cracked heavy oil and may be further separated as necessary. For example, a gasoline fraction, a light thermally-cracked heavy oil, a heavy thermally-cracked heavy oil, and the like can be separated and collected using the distillation tower or the like.

There are cases in which the thermally-cracked heavy oil contains a hydrocarbon having 10 or more carbon atoms and contains the DCPDs represented by dicyclopentadiene ($C_{10}H_{12}$: DCPD). These DCPDs act as catalyst poisons that deteriorate the activity of a catalyst for producing a monocyclic aromatic hydrocarbon used in a cracking and reforming reaction step described below or a catalyst for a hydrogenation treatment used in a hydrogenation reaction step.

Gas (cracked gas) that has been separated in the thermally-cracked heavy oil separation step 3 and has been pressurized using the cracked gas compressor 4 is separated into hydrogen and a component having a higher boiling point than hydrogen in a cryogenic separation step 5 after washing or the like. Next, fractions heavier than hydrogen are supplied to a demethanizer tower 6 and methane is separated and collected. In addition to the above-described configuration, a hydrogen collection unit 7 and a methane collection unit 8 are formed on the downstream side of the cryogenic separation step 5. The collected hydrogen and methane are both used in a cracking and reforming process 21 described below.

The higher boiling point component separated in the demethanizer tower 6 is supplied to a deethanizer tower 9. Ethylene, ethane, and a component having a higher boiling point than ethylene and ethane are separated in the deethanizer tower 9. The ethylene and ethane separated in the deethanizer tower 9 are separated into ethylene and ethane using an ethylene-rectifying tower 10 and the ethylene and ethane are collected respectively. In addition to the above-described configuration, an ethane collection unit 11 and an ethylene collection unit 12 are formed on the downstream side of the ethylene-rectifying tower 10.

The collected ethylene becomes a main product that is produced using the apparatus for producing ethylene. In addition, the collected ethane can also be supplied to the cracking furnace 1 together with the feedstocks such as a naphtha fraction, a kerosene fraction, and a light fraction and be recycled.

The higher boiling point component separated in the deethanizer tower 9 is supplied to a depropanizing tower 13. In addition, propylene, propane, and a component having a higher boiling point that propylene and propane are separated in the depropanizing tower 13. From the propylene and propane separated in the depropanizing tower 13, the propylene is rectified and separated using a propylene-rectifying tower 14 and is collected. In addition to the above-described configuration, a propane collection unit 15 and a propylene collection unit 16 are formed on the downstream side of the propylene-rectifying tower 14. The collected propylene also becomes a main product that is produced using the apparatus for producing ethylene together with ethylene.

The higher boiling point component separated in the depropanizing tower 13 is supplied to a depentanizer tower 17. In addition, a component having 5 or less carbon atoms and a component having a higher boiling point than the above-described component, that is, a component having 6 or more carbon atoms, are separated in the depentanizer tower 17. The component having 5 or less carbon atoms separated in the depentanizer tower 17 is separated into a C4 fraction mainly made of a component having 4 carbon atoms and a fraction mainly made of a component having 5 carbon atoms in a debutanization tower 18 and the fractions are collected respectively. The component having 4 carbon atoms separated in the debutanization tower 18 can also be additionally supplied to an extraction and distillation device or the like, be separated into butadiene, butane, isobutane, and butylene, and these substances can be collected respectively. In addition to the above-described configuration, a butylene collection unit (not illustrated) is formed on the downstream side of the debutanization tower 18.

The higher boiling point component separated in the depentanizer tower 17, that is, the component having 6 or more carbon atoms, mainly contains a monocyclic aromatic hydrocarbon having 6 to 8 carbon atoms and is thus collected as cracked gasoline. In addition to the above-described configuration, a cracked gasoline collection unit 19 is formed on the downstream side of the depentanizer tower 17.

The cracked gasoline collected in the cracked gasoline collection unit 19 is supplied to a BTX refinement device 20 that separates the cracked gasoline into benzene, toluene, and xylene and then collects them respectively. Here, benzene, toluene, and xylene can also be respectively separated and collected and the BTX refinement device is desirably installed from the viewpoint of the production of chemical goods.

At this time, a component having 9 or more carbon atoms contained in the cracked gasoline is separated from the BTX fraction and is collected in the BTX refinement device 20. It is also possible to install a device for separation in the BTX refinement device 20. The component having 9 or more carbon atoms can be used as a feedstock oil for producing an olefin and BTX described below similar to the thermally-cracked heavy oil separated in the thermally-cracked heavy oil separation step 3. In addition, there are frequent cases in which, in the component having 9 or more carbon atoms separated and collected as described above, the content of the above-described DCPDs is increased compared with the content thereof immediately after the DCPDs are separated in the thermally-cracked heavy oil separation step 3. This is assumed to be because, for example, DCPDs are generated by the dimerization of cyclopentadiene (CPD, hereinafter, cyclopentadienes having a substituent will be collectively referred to as CPDs). Since the DCPDs dimerize when the CPDs are cooled, it is considered that a larger amount of the DCPDs are contained due to a heavy component after the collection of a C5 fraction containing the CPDs.

Next, an embodiment of the apparatus for producing ethylene according to the present invention and a method for producing a hydrocarbon using the apparatus for producing ethylene, that is, a method for producing an olefin and a monocyclic aromatic hydrocarbon according to the present invention will be described with reference to FIGS. 1 and 2.

The apparatus for producing ethylene according to the present invention is an apparatus that produces an olefin and a BTX fraction in the cracking and reforming process 21 using a thermally-cracked heavy oil (HAR oil) separated and collected in the thermally-cracked heavy oil separation step 3 as illustrated in FIG. 1, that is, a hydrocarbon mainly having 9 or more carbon atoms which is heavier than the BTX fraction as a feedstock oil. In addition, it is also possible to use a heavy oil remaining after the collection of the BTX fraction from the cracked gasoline collection unit 19 as a feedstock.

In the latter part of the thermally-cracked heavy oil separation step 3, a part of fractions generated after the separation of the thermally-cracked heavy oil into a plurality of fractions or an oil remaining after other chemical goods or fuels are produced from the separated fractions (hereinafter, referred to as "thermally-cracked heavy oil-derived oil") is also a part of a residual oil (bottom oil) obtained from the cracking furnace 1 and is thus contained in the thermally-cracked heavy oil of the present invention, that is, a thermally-cracked heavy oil obtained from the apparatus for producing ethylene. Examples of the production of chemical goods or fuels from the separated fractions include the production of a petroleum resin from a light thermally-cracked heavy oil having approximately 9 or 10 carbon atoms. In addition, a part of fractions generated during the separation of a heavy oil fraction obtained by collecting the BTX fraction from the cracked gasoline collection unit 19 into a plurality of fractions or an oil remaining after other chemical goods or fuels are produced from the separated fractions is also, similarly, contained in the thermally-cracked heavy oil.

In the present embodiment, the apparatus has a configuration illustrated in FIG. 2 in order to carry out the cracking and reforming process 21. The configuration of the apparatus illustrated in FIG. 2 is intended to produce an olefin having 2 to 4 carbon atoms and a monocyclic aromatic hydrocarbon having 6 to 8 carbon atoms (BTX fraction) in which a thermally-cracked heavy oil obtained from the apparatus for producing ethylene is used as a feedstock oil and the olefin or BTX fraction is produced.

(Characteristics of Thermally-Cracked Heavy Oil)

While there is no particular specification, the thermally-cracked heavy oil in the present invention preferably has the following characteristics.

Characteristics obtained from a distillation test significantly vary depending on the cracking temperature or the cracking feedstock, but the 10 volume % distillate temperature (T10) is preferably in a range of 145° C. to 230° C. The 90 volume % distillate temperature (T90) and the end point vary more significantly depending on fractions being used and thus there is no limitation. However, when a fraction directly obtained from the thermally-cracked heavy oil separation step 3 is used, for example, the 90 volume % distillate temperature (T90) is preferably in a range of 400° C. to 600° C. and the end point (EP) is preferably in a range of 450° C. to 800° C.

It is preferable that the density at 15° C. be in a range of 1.03 g/cm$^3$ to 1.08 g/cm$^3$, the kinematic viscosity at 50° C. be in a range of 20 mm$^2$/s to 45 mm$^2$/s, the content of sulfur (sulfur component) be in a range of 100 ppm by mass to 700 ppm by mass, the content of nitrogen (nitrogen component) be 20 ppm by mass or less, and the aromatic component be 80% by volume or more.

Here, the distillation test refers to a test in which characteristics are measured according to "Testing Method For Distillation Of Petroleum Products" described in JIS K 2254, the density at 15° C. refers to the density measured according to "Vibrating Density Testing Method" of "Crude Petroleum And Petroleum Products-Determination Of Density And Petroleum Measurement Tables (excerpt)" described in JIS K 2249, the kinematic viscosity at 50° C. refers to a value obtained according to JIS K 2283 "Crude Petroleum And Petroleum Products-Determination Of Kinematic Viscosity And Calculation Method For Viscosity Index Of Crude Oil And Petroleum Products", the content of sulfur refers to the content of sulfur measured according to "Energy-Dispersive X-Ray Fluorescence Method" of "Crude Petroleum And Petroleum Products-Determination Of Sulfur Content" described in JIS K 2541-1992, the content of nitrogen refers to the content of nitrogen measured according to "Crude Petroleum And Petroleum Products-Determination Of Nitrogen Content" according to JIS K 2609, and the aromatic component refers to the content of total aromatic components measured using Japan Petroleum Institute Standard JPI-5S-49-97 "Hydrocarbon Type Testing Method For Petroleum Products Using High Performance Liquid Chromatography", respectively.

However, in the present invention, the thermally-cracked heavy oil is not directly used as a feedstock oil. The thermally-cracked heavy oil is distilled and separated in advance at a predetermined cut temperature (the 90 volume % distillate temperature is 390° C.) in an early distillation tower 30 illustrated in FIG. 2 and is separated into a light fraction (light thermally-cracked heavy oil) and a heavy fraction (heavy thermally-cracked heavy oil). In addition, a light fraction as described below is used as the feedstock oil. The heavy fraction is separately stored and is used as, for example, a fuel.

(Feedstock Oil)

The feedstock oil according to the present invention is an oil which is a thermally-cracked heavy oil obtained from the apparatus for producing ethylene and has a 90 volume % distillate temperature, as a distillation characteristic, of 390° C. or lower. That is, a light thermally-cracked heavy oil which has been distilled in the early distillation tower 30 and has a 90 volume % distillate temperature, which is a distillation characteristic, adjusted to 390° C. or lower is used as the feedstock oil. When the 90 volume % distillate temperature is set to 390° C. or lower as described above, an aromatic hydrocarbon having 9 to 12 carbon atoms becomes the main component of the feedstock oil and, in a cracking and reforming reaction step in which the contact and reaction with a catalyst for producing an olefin and a monocyclic aromatic hydrocarbon described below are carried out, it is possible to increase the yield of an olefin and a BTX fraction. In addition, in order to further increase the yield of an olefin and a BTX fraction, it is preferable that the 10 volume % distillate temperature (T10) be in a range of 140° C. to 220° C. and the 90 volume % distillate temperature (T90) be in a range of 220° C. to 380° C. and it is more preferable that T10 be in a range of 160° C. to 200° C. and T90 be in a range of 240° C. to 350° C. In a case in which the 90 volume % distillate temperature (T90), which is a distillation characteristic, of the feedstock oil is 390° C. or lower when the feedstock oil is provided to the cracking and reforming process 21, it is not always necessary to carry out the distillation treatment in the early distillation tower 30.

Here, the distillation characteristics are measured according to "Testing Method For Distillation Of Petroleum Products" described in JIS K 2254.

The feedstock oil according to the present invention may include other base materials as long as the feedstock oil includes the thermally-cracked heavy oil obtained from the apparatus for producing ethylene.

As the feedstock oil according to the present invention, in addition to the light thermally-cracked heavy oil obtained by the distillation treatment in the early distillation tower 30, the component having 9 or more carbon atoms separated and collected in the cracked gasoline collection unit 19 as described above can also be used.

In addition, for the fraction having a 90 volume % distillate temperature (T90), which is a distillation characteristic, adjusted to 390° C. or lower, it is not always necessary to carry out distillation in the early distillation tower 30. Therefore, as described below, separately from a thermally-cracked heavy oil illustrated in FIG. 2, it is also possible to directly supply the feedstock oil to a hydrogenation reaction device 31 or a cracking and reforming reaction device 33 which is a device that configures the cracking and reforming process 21 provided behind the early distillation tower 30.

(Dicyclopentadiene Removal Treatment Step)

However, the above-described light thermally-cracked heavy oil, the thermally-cracked heavy oil-derived oil, or the hydrocarbon having 9 or more carbon atoms which is collected in the cracked gasoline collection unit 19 and is, furthermore, separated in the BTX refinement device 20 contains the DCPDs as described above. The DCPDs act as catalyst poisons for each catalyst used in the hydrogenation reaction step or the cracking and reforming reaction step in the cracking and reforming process 21. Therefore, in order to increase the reaction efficiencies in the respective steps, it is necessary to remove the DCPDs from the feedstock oil.

Therefore, in the present embodiment, when the thermally-cracked heavy oil coming from the thermally-cracked heavy oil separation step 3 is supplied to the cracking and reforming process 21 as illustrated in FIG. 1, that is, before the light thermally-cracked heavy oil and the heavy thermally-cracked heavy oil are separated from each other in the early distillation tower 30 as illustrated in FIG. 2, the DCPDs are separated and removed from the thermally-cracked heavy oil. That is, as one of the methods for removing the DCPDs, a heating furnace 26 (dicyclopentadiene removal device) that heats the thermally-cracked heavy oil is disposed on the upper stream side of the early distillation tower 30 and the DCPDs are separated and removed from the thermally-cracked heavy oil. For example, dicyclopentadiene is a dimer of cyclopentadiene and is easily separated into two cyclopentadienes when heated. Since cyclopentadiene has a low boiling point, when the thermally-cracked heavy oil is heated at a predetermined temperature in a range of, for example, 150° C. to 450° C., in the heating furnace 26, dicyclopentadiene is separated into cyclopentadienes having a low boiling point and the cyclopentadiens are gasified and exhausted from the heating furnace 26. That is, dicyclopentadiene is separated and removed from the thermally-cracked heavy oil.

The present embodiment is configured to include the heating furnace 26 disposed on the upper stream side of the early distillation tower 30 and carry out a removal treatment step for removing the DCPDs from the thermally-cracked heavy oil, but the heating furnace 26 may be disposed between the early distillation tower 30 and the hydrogenation reaction device 31 and the removal treatment step of the DCPDs may be carried out on a light thermally-cracked heavy oil derived from the early distillation tower 30. Furthermore, as the early distillation tower 30, a distillation tower having a configuration in which the CPDs (the decomposed substances of the DCPDs) are extracted from the top of the tower, the light thermally-cracked heavy oil is extracted from the middle of the tower, and the heavy thermally-cracked heavy oil is extracted as the bottom fraction may be used.

As described above, the separation treatment step for the light thermally-cracked heavy oil and the heavy thermally-cracked heavy oil in the early distillation tower 30 and the removal treatment step for the DCPDs in the heating furnace 26 (or a distillation tower) may be switched in terms of the order or may be carried out at the same time. In any case, the characteristics of the obtained feedstock oil, that is, an oil which is a thermally-cracked heavy oil and has a 90 volume % distillate temperature, as a distillation characteristic, of 390° C. or lower and from which the DCPDs are removed become identical.

A specific method for removing the DCPDs from the thermally-cracked heavy oil is not limited to a method in which the heating furnace is used and any methods may be used as long as the amount of the DCPDs can be reduced to a predetermined amount. An additional example thereof is a method in which a hydrogenation reaction device for removing the DCPDs that selectively hydrogenates an olefin portion included in the DCPDs contained in the light thermally-cracked heavy oil is provided before a hydrogenation reaction step described below.

The main reason for the DCPDs acting as catalyst poisons is assumed that the DCPDs are cracked, thus, the CPDs are produced, and the produced CPDs repeat the polarization with an olefin compound so as to become heavy. Therefore, in the hydrogenation reaction step for removing the DCPDs, it is necessary to hydrogenate the olefin portion under conditions in which the DCPDs are not cracked or the CPDs produced from the DCPDs do not become excessively heavy. Since the hydrogenation reaction step is provided after the present step, it is not always required to hydrogenate a bicyclic aromatic hydrocarbon in the present step.

Therefore, the reaction temperature of the hydrogenation reaction for removing the DCPDs is preferably lower than that of the hydrogenation reaction step described below and, specifically, is preferably in a range of 50° C. to 180° C. The upper limit temperature is more preferably 150° C. or lower and still more preferably 120° C. or lower. In a case in which the reaction temperature is 180° C. or higher, the DCPDs are excessively cracked during the hydrogenation reaction and a large amount of the CPDs are produced and thus the CPDs act as catalyst poisons for the catalyst for the hydrogenation reaction for removing the DCPDs and it becomes difficult to remove the DCPDs for a sufficient period of time. On the other hand, in a case in which the reaction temperature is 50° C. or lower, the control of the reaction temperature becomes troublesome, which is not preferable.

The hydrogenation catalyst for removing the DCPDs is not particularly limited; however, as a catalyst that easily achieves the above-descried reaction temperature, a catalyst including a noble metal supported in an inorganic carrier such as alumina is preferably used. Examples of a preferable catalyst may include a catalyst including palladium supported in alumina and the like. In addition, when the catalyst is used, it is preferable to carry out a pretreatment before the reaction so as to improve the activity. When the exemplified catalyst including palladium supported in alumina is used, it is preferable to supply hydrogen at a predetermined reaction temperature and a predetermined reaction pressure and form a reducing state.

The hydrogen partial pressure at the reactor inlet during the hydrogenation reaction for removing the DCPDs is preferably in a range of 1 MPa to 9 MPa. The lower limit is more preferably 1.2 MPa or higher and still more preferably 1.5 MPa or higher. In addition, the upper limit is more preferably 7 MPa or lower and still more preferably 5 MPa or lower. In a case in which the hydrogen partial pressure is lower than 1 MPa, coke is vigorously generated on the catalyst and the catalyst life becomes short. On the other hand, in a case in which the hydrogen partial pressure exceeds 9 MPa, the amount of hydrogen consumed significantly increases, also, the building costs for the reactor or peripheral equipment increase, and thus there is a concern that the economic efficiency may be impaired.

In addition, the liquid hourly space velocity (LHSV) in the hydrogenation reaction for removing the DCPDs is preferably in a range of 0.5 $h^{-1}$ to 10 $h^{-1}$. The lower limit is more preferably 1.0 $h^{-1}$ or more and still more preferably 1.5 $h^{-1}$ or more. In addition, the upper limit is more preferably 9 $h^{-1}$ or less and still more preferably 6 $h^{-1}$ or less. In a case in which the LHSV is less than 0.5 $h^{-1}$, the building cost of the reactor becomes excessive and there is a concern that the economic efficiency may be impaired. On the other hand, in a case in which the LHSV exceeds 10 $h^{-1}$, the hydrogenation does not sufficiently proceed and there is a concern that the DCPDs are not sufficiently removed. In this case, there is also a possibility that the DCPDs are introduced into the hydrogenation reaction step in the subsequent part and act as catalyst poisons in the hydrogenation reaction step.

The hydrogen/oil ratio in the hydrogenation reaction for removing the DCPDs is preferably in a range of 100 NL/L to 2000 NL/L. The lower limit is more preferably 110 NL/L or more and still more preferably 120 NL/L or more. In addition, the upper limit is more preferably 1800 NL/L or less and still more preferably 1500 NL/L or less. In a case in which the hydrogen/oil ratio is less than 100 NL/L, the generation of coke on the catalyst in the reactor outlet proceeds and there is a tendency that the catalyst life becomes short. On the other hand, in a case in which the hydrogen/oil ratio exceeds 2000 NL/L, the building cost of a recycling compressor becomes excessive and there is a concern that the economic efficiency may be impaired.

There is no particular limitation regarding the reaction format in the hydrogenation reaction for removing the DCPDs, generally, the reaction format can be selected from a variety of processes such as a fixed bed and a movable bed and, among them, the fixed bed is preferred. In addition, the hydrogenation reaction device for removing the DCPDs preferably has a tower shape.

In the present embodiment, as the feedstock oil provided to the hydrogenation reaction step, an oil having a content of the DCPDs adjusted to 12% by weight or less by the above-exemplified method or the like is used. That is, in the heating furnace 26 (or the distillation tower), the removal treatment of the DCPDs is carried out so that the content of the DCPDs in the light thermally-cracked heavy oil reaches 12% by weight or less, preferably 10% by weight or less, and more preferably 5% by weight or less. When the content of the DCPDs exceeds 12% by weight, the action of the DCPDs as catalyst poisons against the catalyst for the hydrogenation reaction used in the hydrogenation reaction step becomes strong and the efficiency of the hydrogenation reaction is decreased.

The concentration of the DCPDs in the feedstock oil (light thermally-cracked heavy oil) can be detected by sampling the feedstock oil on the upper stream side of the hydrogenation reaction device 31 and analyzing the feedstock oil using, for example, gas chromatograph. Therefore, the content of the DCPDs in the feedstock oil can be adjusted to a predetermined value or less by adjusting the heating treatment conditions in the heating furnace 26 (or the distillation tower) on the basis of the above-described detected value.

All of the feedstock oil having an amount of the DCPDs adjusted to 12% by weight or less, which is obtained as described above, is partially hydrogenated using the hydrogenation reaction device 31. That is, a part or all of the cracked heavy oil is provided to the hydrogenation reaction step.

In the present embodiment, it is possible to partially hydrogenate only the light thermally-cracked heavy oil, that is, only a part of the feedstock oil having an adjusted amount of the DCPDs and not to carry out the hydrogenation treatment on the thermally-cracked heavy oil-derived oil and the component having 9 or more carbon atoms. However, it is needless to say that the hydrocarbon having 9 or more carbon atoms or the component having 9 or more carbon atoms may be partially hydrogenated using the hydrogenation reaction device 31. In this case, on the thermally-cracked heavy oil-derived oil or the component having 9 or more carbon atoms as well, similar to the light thermally-cracked heavy oil, the removal treatment of the DCPDs is carried out and the amount of the DCPDs is adjusted to 12% by weight or less.

(Hydrogenation Treatment of Feedstock Oil [Hydrogenation Reaction Step])

In the thermally-cracked heavy oil obtained from the apparatus for producing ethylene, generally, the content of the aromatic hydrocarbon is extremely large. Therefore, in the present embodiment, a necessary fraction in the previously-separated thermally-cracked heavy oil, that is, a light thermally-cracked heavy oil having an adjusted amount of DCPDs, is used as the feedstock oil and this feedstock oil is hydrogenated in the hydrogenation reaction device 31 (hydrogenation reaction step). However, in order to hydrogenate the feedstock oil until the feedstock oil is hydrocracked, a large amount of hydrogen is required and the use of the fully-hydrogenated feedstock oil extremely decreases the production efficiency of an olefin and a BTX fraction in the cracking and reforming reaction step in which the contact and reaction with a catalyst for producing an olefin and a monocyclic aromatic hydrocarbon described below are carried out.

Therefore, in a hydrogenation reaction step of the present embodiment, the feedstock oil is only partially hydrogenated instead of being fully hydrogenated. That is, mainly bicyclic aromatic hydrocarbon in the feedstock oil is selectively hydrogenated and is converted to a monocyclic aromatic hydrocarbon (naphthenobenzene or the like) in which only one aromatic ring is hydrogenated. Here, examples of the monocyclic aromatic hydrocarbon include indane, tetralin, alkylbenzene, and the like.

When the feedstock oil is partially hydrogenated as described above, the amount of hydrogen consumed in the hydrogenation reaction step is suppressed and, simultaneously, the amount of heat generated during the treatment can also be suppressed. For example, when naphthalene, which is a typical example of the bicyclic aromatic hydrocarbon, is hydrogenated to decalin, the amount of hydrogen consumed per mole of naphthalene reaches 5 moles; however, in a case in which naphthalene is hydrogenated to tetralin, naphthalene can be hydrogenated with an amount of hydrogen consumed of 2 moles. In addition, while there is a large amount of a fraction containing indenes in the feedstock oil (thermally-cracked heavy oil), the amount of hydrogen consumed necessary to hydrogenate the fraction to indanes is far smaller than the amount of hydrogen necessary to hydrogenate naphthalene to tetralin. Therefore, it becomes possible to more efficiently convert the bicyclic aromatic hydrocarbon in the feedstock oil to naphthenobenzenes.

As the hydrogen used in the hydrogenation reaction step, hydrogen collected in the hydrogen collection unit 7 can be used. That is, when hydrogen collected in the hydrogen collection unit 7 is supplied to the hydrogenation reaction device 31, the hydrogenation treatment is carried out. Therefore, hydrogen generated in the same apparatus for producing ethylene is used and thus it is possible to suppress the space or cost required for the storage or transportation of hydrogen to the minimum level.

As the hydrogenation reaction device 31 that carries out the above-described hydrogenation treatment, a well-known hydrogenation reactor can be used. In the hydrogenation reaction step in which the hydrogenation reaction device 31 is used, the hydrogen partial pressure at the reactor inlet is preferably in a range of 1 MPa to 9 MPa. The lower limit is more preferably 1.2 MPa or more and still more preferably 1.5 MPa or more. In addition, the upper limit is more preferably 7 MPa or less and still more preferably 5 MPa or less. In a case in which the hydrogen partial pressure is less than 1 MPa, coke is vigorously generated on the catalyst and the catalyst life becomes short. On the other hand, in a case in which the hydrogen partial pressure exceeds 9 MPa, in addition to a significant increase in the amount of hydrogen consumed, the building costs for the reactor, peripheral equipment or the like increase and there is a concern that the economic efficiency may be impaired.

The liquid hourly space velocity (LHSV) of the hydrogenation reaction step by the hydrogenation reaction device 31 is preferably in a range of 0.05 h$^{-1}$ to 10 h$^{-1}$. The lower limit is more preferably 0.1 h$^{-1}$ or more and still more preferably 0.2 h$^{-1}$ or more. In addition, the upper limit is more preferably 5 h$^{-1}$ or less and more preferably 3 h$^{-1}$ or less. In a case in which the LHSV is less than 0.05 h$^{-1}$, the building cost of the reactor becomes excessive and there is a concern that the economic efficiency may be impaired. On the other hand, in a case in which the LHSV exceeds 10 h$^{-1}$, the feedstock oil is not sufficiently hydrogenated and there is a concern that the stability may deteriorate.

The reaction temperature (hydrogenation temperature) in the hydrogenation reaction step by the hydrogenation reaction device 31 is preferably in a range of 150° C. to 400° C. The lower limit is more preferably 170° C. or higher and still more preferably 190° C. or higher. In addition, the upper limit is more preferably 380° C. or lower and still more preferably 370° C. or lower. In a case in which the reaction temperature is below 150° C., there is a tendency that the feedstock oil is not sufficiently hydrogenated. On the other hand, in a case in which the reaction temperature exceeds 400° C., the generation of a gas component, which is a byproduct, increases and thus the yield of a hydrogenated oil decreases, which is not desirable.

The hydrogen/oil ratio in the hydrogenation reaction step by the hydrogenation reaction device 31 is preferably in a range of 100 NL/L to 2000 NL/L. The lower limit is more preferably 110 NL/L or more and still more preferably 120 NL/L or more. In addition, the upper limit is more preferably 1800 NL/L or less and still more preferably 1500 NL/L or less. In a case in which the hydrogen/oil ratio is less than 100 NL/L, the generation of coke on the catalyst in the reactor outlet proceeds and there is a tendency that the catalyst life becomes short. On the other hand, in a case in which the hydrogen/oil ratio exceeds 2000 NL/L, the building cost of a recycling compressor becomes excessive and there is a concern that the economic efficiency may be impaired.

There is no particular limitation regarding the reaction format in the hydrogenation treatment by the hydrogenation reaction device 31, generally, the reaction format can be selected from a variety of processes such as a fixed bed and a movable bed and, among them, the fixed bed is preferred. In addition, the hydrogenation reaction device 31 preferably has a tower shape.

A catalyst for the hydrogenation treatment which is housed in the hydrogenation reaction device 31 and is used for the hydrogenation treatment of the feedstock oil is not limited as long as the catalyst is capable of selectively hydrogenating and converting bicyclic aromatic hydrocarbons in the feedstock oil to monocyclic aromatic hydrocarbons (naphthenobenzenes or the like) in which only one aromatic ring is hydrogenated. A preferable catalyst for the hydrogenation treatment contains at least one metal selected from Group 6 metals in the periodic table and at least one metal selected from Groups 8 to 10 metals in the periodic table. The Group 6 metal in the periodic table is preferably molybdenum, tungsten, or chromium and particularly preferably molybdenum or tungsten. The Groups 8 to 10 metal is preferably iron, cobalt, or nickel and more preferably cobalt or nickel. These metals may be singly used or a combination of two or more metals may be used. Specific examples of the combination that is preferably used include molybdenum-cobalt, molybdenum-nickel, tungsten-nickel, molybdenum-cobalt-nickel, tungsten-cobalt-nickel, and the like. The periodic table refers to the extended periodic table specified by the International Union of Pure and Applied Chemistry (IUPAC).

The catalyst for the hydrogenation treatment is preferably a catalyst obtained by supporting the above-described metals in an inorganic carrier containing aluminum oxide. Preferable examples of the inorganic carrier containing aluminum oxide include carriers obtained by adding a porous inorganic compound such as a variety of clay minerals such as alumina, alumina-silica, alumina-boria, alumina-titania, alumina-zirconia, alumina-magnesia, alumina-silica-zirconia, alumina-silica-titania, a variety of zeolites, sebiolite, and montmorillonite to alumina and, among them, alumina is particularly preferred.

The catalyst for the hydrogenation treatment is preferably a catalyst obtained by supporting at least one metal selected from Group 6 metals in the periodic table in a range of 10% by mass to 30% by mass and at least one metal selected from Groups 8 to 10 metals in the periodic table in a range of 1% by mass to 7% by mass in an inorganic carrier containing aluminum oxide in relation to the total catalyst mass which is the total mass of the inorganic carrier and the metals. In a case in which the support amount of the Group 6 metals in the periodic table and the support amount of the Groups 8 to 10 metals in the periodic table are less than the respective lower limits, there is a tendency that the catalyst does not exhibit sufficient hydrogenation treatment activity and, on the other hand, in a case in which the support amounts exceed the respective upper limits, the catalyst cost increases, the supported metals are likely to be agglomerated or the like, and there is a tendency that the catalyst does not exhibit sufficient hydrogenation treatment activity.

There is no particular limitation regarding the precursor of the metallic species used to support the metals in the inorganic carrier, the inorganic salts, organic metal compounds, or the like of the metals are used, and water-soluble inorganic salts are preferably used. In a supporting step, the metals are supported in the inorganic carrier using a solution, preferably an aqueous solution, of the metal precursor. As a supporting operation, for example, a well-known method such as an immersion method, an impregnation method, or a co-precipitation method is preferably employed.

It is preferable that the carrier in which the metal precursor is supported be fired after being dried, preferably in the presence of oxygen, and the metallic species be, first, made to form an oxide. Furthermore, it is preferable, before the hydrogenation treatment of the feedstock oil, to form a sulfide with the metal species through a sulfurization treatment called preliminary sulfurization.

There is no particular limitation regarding the conditions of the preliminary sulfurization, but it is preferable that a sulfur compound be added to a distilled petroleum fraction or a thermally-cracked heavy oil (hereinafter, referred to as the preliminary sulfurization feedstock oil) and the compound be continuously brought into contact with the catalyst for the hydrogenation treatment under conditions of a temperature in a range of 200° C. to 380° C., LHSV in a range of 1 h$^{-1}$ to 2 h$^{-1}$, a pressure applied at the same time as the operation of the hydrogenation treatment, and a treatment time of 48 hours or longer. The sulfur compound added to the preliminary sulfurization feedstock oil is not particularly limited and is preferably dimethyl disulfide (DMDS), sulfazole, hydrogen sulfide, or the like, and approximately 1% by mass of the sulfur compound in terms of the mass of the preliminary sulfurization feedstock oil is preferably added to the preliminary sulfurization feedstock oil.

Since the above-described catalyst for the hydrogenation treatment acts as a catalyst poison when the DCPDs are present as described above, the activity significantly degrades. As a result, the catalyst effects degrade and the efficiency of the hydrogenation reaction that partially hydrogenates the feedstock oil decreases. However, in the present embodiment, since an oil having a content of the DCPDs adjusted to 12% by weight or less is used as the feedstock oil as described above, the activity deterioration of the catalyst for the hydrogenation treatment is suppressed and there is no concern that the efficiency of the hydrogenation reaction may decrease.

(Hydrogenated Oil of Feedstock Oil)

The hydrogenated oil of the feedstock oil obtained from the hydrogenation reaction device 31 (hydrogenation reaction step) described above preferably has the following characteristics.

Regarding the distillation characteristics, it is preferable that the 10 volume % distillate temperature (T10) be in a range of 140° C. to 200° C. and the 90 volume % distillate temperature (T90) be in a range of 200° C. to 390° C. and it is more preferable that T10 be in a range of 160° C. to 190° C. and T90 be in a range of 210° C. to 370° C. When T10 is lower than 140° C., the formed feedstock oil containing the hydrogenated oil may contain xylene which is one of the target substances, which is not preferable. On the other hand, when T90 exceeds 390° C. (the hydrogenated oil becomes a heavy oil), the catalyst performance is degraded due to the metal poisoning of the hydrogenation treatment catalyst, coke precipitation, and the like, the inhibition of predetermined performance due to an increase in coke precipitation in the catalyst for producing a monocyclic aromatic hydrocarbon described below, and an increase in the amount of hydrogen consumed which is not economical, which is not preferable.

The hydrogenated oil of the feedstock oil is supplied to a cracking and reforming reaction device 33 after hydrogen is removed in a dehydrogenation tower 32 provided behind the hydrogenation reaction device as illustrated in FIG. 2 and is thus supplied to the cracking and reforming reaction step. In addition, it is also possible to directly supply a fraction mainly containing a hydrocarbon having approximately 9 or 10 carbon atoms which does not contain many polycyclic aromatics and has little need of hydrogenation to the cracking and reforming reaction device 33 together with the hydrogenated oil.

However, since the DCPDs also act as catalyst poisons against the catalyst for producing an olefin and a monocyclic aromatic hydrocarbon which is used in the cracking and reforming reaction step as described above, in order to increase the reaction efficiency in the cracking and reforming reaction step, it is necessary to remove the DCPDs from the feedstock oil being supplied to the cracking and reforming reaction device 33. Since the hydrogenated oil obtained from the hydrogenation reaction device 31 has already been subjected to the removal treatment of the DCPDs in the heating furnace 26 (or the distillation tower), the hydrogenated oil has no problem, but the thermally-cracked heavy oil-derived oil and the component having 9 or more carbon atoms which are collected in the cracked gasoline collection unit 19 and are separated in the BTX refinement device 20 both contain the DCPDs as described above.

Therefore, in the present embodiment, even for the thermally-cracked heavy oil-derived oil and the component having 9 or more carbon atoms (hereinafter, the C9 fraction) separated in the BTX refinement device 20, the DCPDs are separated and removed from these hydrocarbons before the hydrocarbons are provided to the cracking and reforming reaction device 33. Specifically, when a heating furnace 27 (dicyclopentadiene removal device) that heats the C9 fraction is disposed on the upper stream side of the cracking and reforming reaction device 33 as illustrated in FIG. 2 and the C9 fraction is heated at a temperature in a range of, for example, 100° C. to 450° C. together with the hydrogenated oil using the heating furnace 27, the DCPDs are separated and removed from the C9 fraction.

In the present embodiment, as a mixed oil of the feedstock oils provided to the cracking and reforming reaction device 33 (cracking and reforming reaction step), that is, the light thermally-cracked heavy oil, the thermally-cracked heavy oil-derived oil, and the C9 fraction, an oil having a content of the DCPDs adjusted to 10% by weight or less is used. That is, the removal treatment of the DCPDs is carried out in the heating furnace 27 so that the content of the DCPDs in the mixed oil reaches 10% by weight or less, preferably 7% by weight or less, and more preferably 5% by weight or less. This is because, when the content of the DCPDs exceeds 10% by weight, the action of the DCPDs as catalyst poisons against the catalyst for producing an olefin and a monocyclic aromatic hydrocarbon used in the cracking and reforming reaction step becomes strong and there is a concern that the efficiency of the cracking and reforming reaction is decreased.

The concentration of the DCPDs in the feedstock oil (the mixed oil) can be detected by sampling the feedstock oil (the mixed oil) on the upper stream side of the cracking and reforming reaction device 33 and analyzing the feedstock oil using, for example, gas chromatograph. Therefore, the content of the DCPDs in the mixed oil can be adjusted to a predetermined value or less by adjusting the heating treatment conditions in the heating furnace 27 on the basis of the above-described detected value.

As described above, there is no particular limitation regarding the removal method of the DCPDs and a hydrogenation reaction device for removing the DCPDs may be separately provided.

In addition, between the heating furnace 27 and the cracking and reforming reaction device 33, separately from the heating furnace 27, a heating furnace (not illustrated) that carries out a heating treatment before the mixed oil is provided to the cracking and reforming reaction device 33 is provided. The mixed oil is preferably in a gaseous state when brought into contact with the catalyst in the cracking and reforming reaction device 33. Therefore, the feedstock oil is heated in the heating furnace and is thus put into a gaseous state or similar state. Hydrogen removed and collected from the dehydrogenation tower 32 can be returned again to the hydrogenation reaction device 31 and be subjected to a hydrogenation treatment and it is also possible to collect hydrogen again in the apparatus for producing ethylene.

Since the cracking and reforming reaction device 33 houses the catalyst for producing an olefin and a monocyclic aromatic hydrocarbon, in the cracking and reforming reaction device, the supplied feedstock oil (containing the mixed oil) is brought into contact with the catalyst, the feedstock oil and the catalyst are reacted together, and a product containing an olefin having 2 to 4 carbon atoms and a monocyclic aromatic hydrocarbon having 6 to 8 carbon atoms is obtained.

(Catalyst for Producing Olefin and Monocyclic Aromatic Hydrocarbon)

The catalyst for producing an olefin and a monocyclic aromatic hydrocarbon contains crystalline aluminosilicate. The content of the crystalline aluminosilicate is not particularly limited, but is preferably in a range of 10% by mass to 100% by mass, more preferably in a range of 20% by mass to 95% by mass, and still more preferably in a range of 25% by mass to 90% by mass.

[Crystalline Aluminosilicate]

The crystalline aluminosilicate preferably includes a medium-pore zeolite and/or a large-pore zeolite as a main component since the yield of a monocyclic aromatic hydrocarbon can be further increased.

The medium-pore zeolite is a zeolite having a 10-membered ring skeleton structure and examples of the medium-pore zeolite include zeolites having an AEL-type, EUO-type, FER-type, HEU-type, MEL-type, MFI-type, NES-type, TON-type, or WEI-type crystal structure. Among them, since the yield of a monocyclic aromatic hydrocarbon can be further increased, a zeolite having the MFI-type crystal structure is preferred.

The large-pore zeolite is a zeolite having a 12-membered ring skeleton structure and examples of the large-pore zeolite include zeolites having an AFI-type, ATO-type, BEA-type, CON-type, FAU-type, GME-type, LTL-type, MOR-type, MTW-type, or OFF-type crystal structure. Among them, zeolites having the BEA-type, FAU-type, or MOR-type crystal structure are preferred since they can be industrially used and a zeolite having the BEA-type crystal structure is preferred since the yield of a monocyclic aromatic hydrocarbon can be further increased.

In addition to the medium-pore zeolite and/or the large-pore zeolite, the crystalline aluminosilicate may contain a small-pore zeolite having a 10 or less-membered ring skeleton structure and an ultralarge-pore zeolite having a 14 or more-membered skeleton structure.

Here, examples of the small-pore zeolite include zeolites having an ANA-type, CHA-type, ERI-type, GIS-type, KFI-type, LTA-type, NAT-type, PAU-type, and YUG-type crystal structure.

Examples of the ultralarge-pore zeolite include zeolites having a CLO-type or VPI-type crystal structure.

In addition, in the crystalline aluminosilicate, the molar ratio (Si/Al ratio) of silicon to aluminum is 100 or less and preferably 50 or less. When the Si/Al ratio of the crystalline aluminosilicate exceeds 100, the yield of a monocyclic aromatic hydrocarbon becomes low.

In addition, the Si/Al ratio of the crystalline aluminosilicate is preferably 10 or more in terms of the improvement of the yield of a monocyclic aromatic hydrocarbon.

The catalyst for producing an olefin and a monocyclic aromatic hydrocarbon according to the present invention may further contain potassium and/or zinc. When the catalyst contains potassium and/or zinc, a more efficient BTX production can be expected.

Examples of the crystalline aluminosilicate containing potassium and/or zinc include crystalline aluminosilicate having gallium incorporated into the lattice skeleton (crystalline aluminogallosilicate), crystalline aluminosilicate having zinc incorporated into the lattice skeleton (crystalline aluminozincosilicate), crystalline aluminosilicate having gallium supported therein (Ga-supported crystalline aluminosilicate), crystalline aluminosilicate having zinc supported therein (Zn-supported crystalline aluminosilicate), and crystalline aluminosilicate containing at least one thereof.

The Ga-supported crystalline aluminosilicate and/or the Zn-supported crystalline aluminosilicate are crystalline aluminosilicates in which gallium and/or zinc are supported using a well-known method such as an ion exchange method or an impregnation method. There is no particular limitation regarding a gallium source and a zinc source used at this time and examples thereof include gallium salts such as gallium nitrate and gallium chloride, zinc salts such as gallium oxide, zinc nitrate, and zinc chloride, zinc oxide, and the like.

The upper limit of the content of gallium and/or zinc in the catalyst is preferably 5% by mass or less, more preferably 3% by mass or less, still more preferably 2% by mass or less, and still more preferably 1% by mass or less in a case in which the total amount of the catalyst is considered as 100% by mass.

When the content of gallium and/or zinc exceeds 5% by mass, the yield of a monocyclic aromatic hydrocarbon becomes low, which is not preferable.

In addition, the lower limit of the content of gallium and/or zinc is preferably 0.01% by mass or more and more preferably 0.1% by mass or more in a case in which the total amount of the catalyst is considered as 100% by mass. When the content of gallium and/or zinc is less than 0.01% by mass, the yield of a monocyclic aromatic hydrocarbon becomes low, which is not preferable.

The crystalline aluminogallosilicate and/or the crystalline aluminozincosilicate are crystalline aluminosilicates having a structure in which the $SiO_4$, $AlO_4$, and $GaO_4/ZnO_4$ structure is tetrahedrally coordinated in the skeleton and can be obtained using gel crystallization through hydrothermal synthesis, a method in which gallium and/or zinc are inserted into the lattice skeleton of the crystalline aluminosilicate, or a method in which aluminum is inserted into the lattice skeleton of the crystalline gallosilicate and/or the crystalline zincosilicate.

The catalyst for producing an olefin and a monocyclic aromatic hydrocarbon preferably contains phosphorous. The content of phosphorous in the catalyst is preferably in a range of 0.1% by mass to 10.0% by mass in a case in which the total amount of the catalyst is considered as 100% by mass. The lower limit of the content of phosphorous is preferably 0.1% by mass or more and more preferably 0.2% by mass or more since a decrease in the yield of a monocyclic aromatic hydrocarbon over time can be prevented. On the other hand, the upper limit of the content of phosphorous is preferably 10.0% by mass or less, more preferably 6.0% by mass or less, and still more preferably 3.0% by mass or less since the yield of a monocyclic aromatic hydrocarbon can be increased.

There is no particular limitation regarding the method for adding phosphorous to the catalyst for producing an olefin and a monocyclic aromatic hydrocarbon and examples thereof include a method in which phosphorous is supported in the crystalline aluminosilicate, the crystalline aluminogallosilicate, or the crystalline aluminozincosilicate using an ion exchange method, an impregnation method, or the like, a method in which a phosphorous compound is added during the synthesis of a zeolite so as to substitute a part of the inside of the skeleton of the crystalline aluminosilicate with phosphorous, a method in which a phosphorous-containing crystal accelerator is used during the synthesis of a zeolite, and the like. An aqueous solution containing phosphoric acid ions which is used during the addition of phosphorous is not particularly limited and an aqueous solution prepared by dissolving phosphoric acid, diammonium hydrogen phosphate, ammonium dihydrogen phosphate, and other water-soluble phosphate, or the like in water at an arbitrary concentration can be preferably used.

The catalyst for producing an olefin and a monocyclic aromatic hydrocarbon can be formed by firing phosphorous-supported crystalline aluminogallosilicate/crystalline aluminozincosilicate, or gallium/zinc and phosphorous-supported crystalline aluminosilicate (at a firing temperature in a range of 300° C. to 900° C.) as described above.

In addition, the catalyst for producing an olefin and a monocyclic aromatic hydrocarbon is formed in a powder form, a granular form, a pellet form, or the like depending on the reaction format in the cracking and reforming reaction device 33 (cracking and reforming reaction step). For example, in the case of a fixed bed, the catalyst is formed in a granular form or a pellet form and, in the case of a fluidized bed, the catalyst is formed in a powder form.

In a case in which a granular-form or pellet-form catalyst is obtained, it is possible to blend an inactive oxide with the catalyst as a binder as necessary and then shape the catalyst using a variety of shaping devices.

Specifically, in a case in which the catalyst is used in a fixed bed, an inorganic substance such as silica or alumina is preferably used as the binder.

In a case in which the catalyst for producing an olefin and a monocyclic aromatic hydrocarbon contains a binder or the like, a substance containing phosphorous may be used as the binder as long as the content of phosphorous is in the above-described preferable range.

In addition, in a case in which the catalyst for producing an olefin and a monocyclic aromatic hydrocarbon contains a binder, it is also possible to mix the binder and the gallium and/or zinc-supported crystalline aluminosilicate or mix the binder and the crystalline aluminogallosilicate and/or crystalline aluminozincosilicate and then add phosphorous, thereby producing a catalyst.

The above-described catalyst for producing an olefin and a monocyclic aromatic hydrocarbon significantly deteriorates in terms of the activity when dicyclopentadiens are present as described above since the dicyclopentadiens act as catalyst poisons. As a result, the catalyst effects degrade and the efficiency of the cracking and reforming reaction that cracks and reforms the feedstock oil (the mixed oil) decreases. However, in the present embodiment, since an oil having a content of the DCPDs adjusted to 10% by weight or less is used as the feedstock oil as described above, the activity deterioration of the catalyst for producing a monocyclic aromatic hydrocarbon is suppressed and there is no concern that the efficiency of the cracking and reforming reaction may decrease.

[Reaction Format]

Examples of the reaction format in the cracking and reforming reaction device 33, that is, the reaction format in which the feedstock oil is brought into contact with the catalyst for producing an olefin and a monocyclic aromatic hydrocarbon using the cracking and reforming reaction device 33, thereby causing a cracking and reforming reaction include a fixed bed, a movable bed, a fluidized bed, and the like.

Particularly, the fixed bed is more preferable than the fluidized bed or the movable bed since the apparatus cost is extremely low. Therefore, while it is still possible to repeat the reaction and reproduction using a single fixed-bed reactor, it is preferable to install two or more reactors in order to continuously cause the reaction. In the present embodiment, the fixed-bed cracking and reforming reaction device 33 (fixed-bed reactor) is used and the number of the fixed-bed reactors 33 used is two as illustrated in FIG. 2. In FIG. 2, while two fixed-bed reactors 33 are illustrated, the number of the fixed-bed reactors is not limited thereto and an arbitrary number of the fixed-bed reactors can be installed as long as the number is plural.

In the fixed-bed cracking and reforming reaction device 33, even when only a small amount of DCPDs are contained in the feedstock oil, as the cracking and reforming reaction is caused, coke is attached particularly to the catalyst surface and the activity of the catalyst degrades. When the activity degrades as described above, in the cracking and reforming reaction step (cracking and reforming reaction device 33), while the yield of an olefin having 2 to 4 carbon atoms increases, the yield of a monocyclic aromatic hydrocarbon having 6 to 8 carbon atoms decreases and the total amount of the olefin having 2 to 4 carbon atoms and the monocyclic aromatic hydrocarbon having 6 to 8 carbon atoms decreases. Therefore, the reproduction treatment of the catalyst becomes necessary.

In the fixed-bed cracking and reforming reaction device 33 (fixed-bed reactor), since the activity of the catalyst is degraded by the attachment of coke, the reproduction treatment of the catalyst is carried out after the cracking and reforming reaction device is operated for a previously-set predetermined time. That is, two or more cracking and reforming reaction devices 33 (fixed-bed reactors) are used and the cracking and reforming reaction and the reproduction of the catalyst for producing an olefin and a monocyclic aromatic hydrocarbon are repeated by periodically switching the devices. The operation time during which the reaction is continuously operated with one cracking and reforming reaction device 33 varies depending on the size of the device or a variety of operation conditions (reaction conditions) but is in a range of approximately several hours to 10 days. When a large number of the cracking and reforming reaction devices 33 (fixed-bed reactors) are used, it is possible to shorten the continuous operation time of each reactor and to suppress the activity degradation of the catalyst and thus the time necessary for reproduction can be shortened.

[Reaction Temperature]

The reaction temperature when the feedstock oil is brought into contact with and is reacted with the catalyst is not particularly limited, but is preferably in a range of 350° C. to 700° C. and more preferably in a range of 400° C. to 650° C. When the reaction temperature is lower than 350° C., the reaction activity is not sufficient. When the reaction temperature exceeds 700° C., the reaction becomes disadvantageous in terms of energy and the amount of coke generated is significantly increased and thus the production efficiency of the target substance is decreased.

[Reaction Pressure]

The reaction pressure when the feedstock oil is brought into contact with and is reacted with the catalyst is in a range of 0.1 MPaG to 2.0 MPaG. That is, the feedstock oil is brought into contact with the catalyst for producing a monocyclic aromatic hydrocarbon at a pressure in a range of 0.1 MPaG to 2.0 M PaG.

In the present invention, since the reaction concept is completely different from that of a method of the related art in which hydrogenolysis is used, a condition of high pressure, which is preferred in hydrogenolysis, is not required. Conversely, a pressure higher than necessary accelerates cracking and produces unintended light gas as a byproduct, which is not preferable. In addition, the non-necessity of the high-pressure condition is also preferred in terms of the design of the reaction apparatus. Therefore, when the reaction pressure is in a range of 0.1 MPaG to 2.0 MPaG, it is possible to efficiently cause a cracking and reforming reaction.

[Contact Time]

The contact time between the feedstock oil and the catalyst is not particularly limited as long as a desired reaction substantially proceeds and, for example, the gas passing time over the catalyst is preferably in a range of 2 seconds to 150 seconds, more preferably in a range of 3 seconds to 100 seconds, and still more preferably in a range of 5 seconds to 80 seconds. When the contact time is shorter than 2 seconds, a substantial reaction is difficult. When the contact time exceeds 150 seconds, the amount of a carbonaceous material accumulated on the catalyst due to coking or the like increases or the amount of light gas generated by cracking increases and, furthermore, the size of the device is also increased, which is not preferable.

[Reproduction Treatment]

Once a cracking and reforming reaction treatment (cracking and reforming reaction step) is carried out for a predetermined time using the cracking and reforming reaction device 33, the cracking and reforming reaction treatment is operated using the other cracking and reforming reaction device 33 and, for the cracking and reforming reaction device 33 stopped to be used for the cracking and reforming reaction treatment, the reproduction of the catalyst for producing an olefin and a monocyclic aromatic hydrocarbon having the degraded activity is carried out.

Since the catalyst degradation of the catalyst is mainly caused by the attachment of coke to the catalyst surface, as the reproduction treatment, a treatment to remove coke from the catalyst surface is carried out. Specifically, air is circulated in the cracking and reforming reaction device 33 and coke attached to the catalyst surface is combusted. Since the cracking and reforming reaction device 33 is maintained at a sufficiently high temperature, the coke attached to the catalyst surface is easily combusted simply by circulating air. However, when ordinary air is supplied and circulated in the cracking and reforming reaction device 33, there is a concern of abrupt combustion. Therefore, it is preferable to supply and circulate air having an oxygen concentration decreased by interfusing nitrogen in advance to the cracking and reforming reaction device 33. That is, as the air used in the reproduction treatment, for example, air having an oxygen concentration decreased in a range of approximately several % to 10% is preferably used. In addition, it is not necessary to equal the reaction temperature and the reproduction temperature and preferred temperatures can be appropriately set.

[Dilution Treatment]

In the cracking and reforming reaction treatment in the cracking and reforming reaction device 33, in order to suppress the attachment of coke to the catalyst surface, it is preferable to treat the feedstock oil in a state in which a saturated hydrocarbon having 1 to 3 carbon atoms, for example, methane, is provided to the cracking and reforming reaction device 33 as illustrated in FIG. 2 so as to let the methane coexist. Methane is almost unreactive and thus, even when methane is brought into contact with the catalyst in the cracking and reforming reaction device 33, any reaction is not caused. Therefore, the methane acts as a diluting agent that decreases the concentration of the heavy hydrocarbon derived from the feedstock oil on the catalyst surface and suppresses (hinders) the progress of the catalytic reaction of the heavy hydrocarbon on the catalyst surface. Therefore, the coexistence of the methane can suppress the heavy hydrocarbon derived from the feedstock oil being attached to the catalyst surface so as to become coke.

As the methane provided to the cracking and reforming reaction device 33, methane collected in the methane collection unit 11 is used. That is, the methane collected in the methane collection unit 11 is provided to the cracking and reforming reaction device 33 as a diluting agent. Since methane generated in the same apparatus for producing ethylene is used, it is possible to suppress the space or cost necessary for the storage, transportation, and the like of methane at a minimum level. The methane provided to the cracking and reforming reaction device 33 as described above is heated to a predetermined temperature in the heating furnace (not illustrated) provided on the upper stream side in the cracking and reforming reaction device 33, that is, a heating furnace disposed on the upper stream side of the heating furnace 27, together with the feedstock oil (the mixed oil). Ethane or propane can also be used instead of methane and, among them, methane is more preferably used since the reactivity is lowest and a sufficient amount can be collected in the same apparatus for producing ethylene.

In addition, in the present invention, instead of using the fixed bed as the cracking and reforming reaction device 33, it is also possible to use, for example, a fluidized bed which is capable of continuously removing the coke component attached to the catalyst and causing the reaction in a stable manner. In this case, a continuous reproduction-type fluidized bed in which the catalyst is circulated between the reactor and the reproduction device and the reaction and reproduction are continuously repeated is more preferably used. However, since the apparatus cost of the fluidized reactor increases compared with the fixed-bed reactor, the fixed-bed reactor is preferably used in order to suppress the cost increase of the entire apparatus for producing ethylene.

(Refinement and Collection of Olefin and BTX Fraction)

A cracking and reforming reaction product derived from the cracking and reforming reaction device 33 contains a gas containing an olefin having 2 to 4 carbon atoms, a BTX fraction, and an aromatic hydrocarbon of C9 or more. Therefore, the cracking and reforming reaction product is separated into the respective components, refined, and collected using a refinement and collection device 34 provided behind the cracking and reforming reaction device 33.

The refinement and collection device 34 includes a BTX fraction collection tower 35 and a gas separation tower 36.

In the BTX fraction collection tower 35, the cracking and reforming reaction product is distilled and separated into a light fraction having 8 or less carbon atoms and a heavy fraction having 9 or more carbon atoms. In the gas separation tower 36, the light fraction having 8 or less carbon atoms separated in the BTX fraction collection tower 35 is distilled and separated into a BTX fraction containing benzene, toluene, and coarse xylene and a gas fraction having a boiling point lower than that of the BTX fraction. In the BTX fraction collection tower 35 and the gas separation tower 36, the fractions obtained from the respective towers are retreated and thus it is not necessary to increase the distillation accuracy and it is possible to carry out the distillation operation in a relatively brief manner.

(Product Collection Step)

As described above, in the gas separation tower 36, since the distillation operation is carried out in a relatively brief manner, the gas fraction separated in the gas separation tower 36 mainly contains hydrogen, C4 fractions such as ethylene, propylene, and butylene, and BTX. Therefore, the gas fraction, that is, a gas fraction that serves as a part of the product obtained in the cracking and reforming reaction step, is treated again in the product collection device 2 as illustrated in FIG. 1. That is, the gas fraction is provided to the thermally-cracked heavy oil separation step 3 together with the cracking product obtained in the cracking furnace 1. In addition, hydrogen or methane is separated and collected by treating the gas fraction mainly using the cracked gas compressor 4, the demethanizer tower 6, and the like and, furthermore, the gas fraction is treated using the deethanizer tower 9 and the ethylene-rectifying tower 10 so as to collect ethylene. In addition, the gas fraction is treated using the depropanizing tower 13 and the propylene-rectifying tower 14 so as to collect propylene and is treated using the depentanizer tower 17, the debutanization tower 18, and the like so as to collect a cracked gasoline such as butylene or butadiene.

Benzene, toluene, and xylene separated using the gas separation tower 36 illustrated in FIG. 2 are provided to the BTX refinement device 20 illustrated in FIG. 1, and benzene, toluene, and xylene are respectively refined and rectified so as to be separated and collected as products. In addition, in the present embodiment, BTX is collectively collected, but may be respectively and separately collected using the configuration of the apparatus and the like in the latter part. For example, xylene may be directly supplied to an apparatus for producing paraxylene or the like instead of the BTX refinement device.

(Recycling Step)

The heavy fraction (bottom fraction) having 9 or more carbon atoms separated in the BTX fraction collection tower 35 is returned to the hydrogenation reaction device 31 through a recycling path 37 (recycling step) which is recycle means and is again provided to the hydrogenation reaction step together with the light thermally-cracked heavy oil derived from the early distillation tower 30. That is, the bottom fraction is returned to the cracking and reforming reaction device 33 through the hydrogenation reaction device 31 and is provided to the cracking and reforming reaction step. Since the DCPDs has already been removed so as to obtain a predetermined concentration or less, the bottom fraction separated in the BTX fraction collection tower 35 can be directly provided to the hydrogenation reaction step without being provided to the heating furnace 26. In the recycling step (recycling path 37), for example, a heavy component having a 90 volume % distillate temperature (T90), as a distillation characteristic, of higher than 390° C. is preferably cut back before being provided to the hydrogenation reaction device 31 (hydrogenation reaction step) and stored with the heavy thermally-cracked heavy oil. Even in a case in which a fraction having a 90 volume % distillate temperature (T90) of higher than 390° C. is rarely contained, it is preferable to discharge a certain amount of the fraction outside the system when fractions having a low reactivity are accumulated or the like.

According to the apparatus for producing ethylene and the method for producing an olefin having 2 to 4 carbon atoms and a monocyclic aromatic hydrocarbon having 6 to 8 carbon atoms using the apparatus for producing ethylene of the present embodiment, the DCPDs that deteriorate the activity of the catalyst for producing an olefin and a monocyclic aromatic hydrocarbon are removed from all the feedstock oil that is provided to the cracking and reforming reaction device 33 (cracking and reforming reaction step) and the concentration of the dicyclopentadienes in the feedstock oil is adjusted to 10% by weight or less, and thus it is possible to suppress the deterioration of the activity of the catalyst for producing an olefin and a monocyclic aromatic hydrocarbon in the cracking and reforming reaction step. Therefore, it is possible to suppress the efficiency degradation of the cracking and reforming reaction and to produce the BTX fraction with high production efficiency.

In addition, the feedstock oil made of the thermally-cracked heavy oil obtained from the apparatus for producing ethylene is cracked and reformed using the cracking and reforming reaction device 33 and a part of the obtained product is collected and treated in the product collection device 2 in the apparatus for producing ethylene and thus it is possible to easily collect an olefin produced as a byproduct from the cracking and reforming reaction device 33 using the existing product collection device 2 without building a new device. Therefore, while an increase in the cost is suppressed, it is also possible to efficiently produce an olefin.

In addition, since the hydrogenation reaction device 31 (hydrogenation reaction step) that partially hydrogenates a part of the feedstock oil (light thermally-cracked heavy oil) is provided in front of the cracking and reforming reaction device 33 (cracking and reforming reaction step), it is possible to suppress the amount of hydrogen consumed in the hydrogenation reaction step and, simultaneously, suppress the amount of heat generated during the treatment and, furthermore, it is possible to more efficiently produce a BTX fraction in the cracking and reforming reaction device 33 (cracking and reforming reaction step).

Furthermore, since an oil having a concentration of the DCPDs adjusted to 12% by weight or less is used as the feedstock oil supplied to the cracking and reforming reaction device 33 (cracking and reforming reaction step), it is possible to suppress the deterioration of the activity of the hydrogenation catalyst in the hydrogenation reaction step and, consequently, it is possible to produce BTX with high production efficiency.

In addition, since two or more fixed-bed reactors are used as the cracking and reforming reaction device 33 and the cracking and reforming reaction and the reproduction of the catalyst for producing an olefin and a monocyclic aromatic hydrocarbon are repeated by periodically switching the reactors, it is possible to produce the BTX fraction with high production efficiency. In addition, since the fixed-bed reactor of an apparatus cost that is extremely lower compared with that of the fluidized-bed reactor is used, it is possible to suppress the cost of the configuration of the apparatus used for the cracking and reforming process 21 at a sufficiently low level. Furthermore, since the olefin generated together with the BTX fraction can also be easily collected using the existing product collection device 2 in the apparatus for producing ethylene, it is also possible to produce the olefin with high production efficiency together with the BTX fraction.

The present invention is not limited to the embodiment and a variety of modifications are permitted within the scope of the gist of the present invention.

For example, in the present embodiment, the heating furnace 27 is disposed between the hydrogenation reaction device 31 and the cracking and reforming reaction device 33 and the DCPDs are removed from all the feedstock oil that is provided to the cracking and reforming reaction device 33, but the component having 9 or more carbon atoms separated in the BTX refinement device 20 contains a large amount of the DCPDs and thus it is also possible to carry out a treatment that removes the DCPDs only from the component having 9 or more carbon atoms separated in the BTX refinement device 20. Specifically, instead of disposing the heating furnace 27 between the hydrogenation reaction device 31 and the cracking and reforming reaction device 33, it is also possible to dispose a heating furnace (not illustrated) on the downstream side of the BTX refinement device 20 illustrated in FIG. 1 and carry out a treatment that removes the DCPDs from the component having 9 or more carbon atoms separated in the BTX refinement device 20.

In addition, in the embodiment, the cracking and reforming reaction is caused using the cracking and reforming reaction device 33 and a part of the obtained product is collected using the product collection device 2 in the apparatus for producing ethylene, but all of the product obtained from the cracking and reforming reaction may be collected using the product collection device 2 in the apparatus for producing ethylene.

Furthermore, in the present embodiment, a part of the product obtained through the cracking and reforming reaction in the cracking and reforming reaction device 33 is collected in the product collection device 2 in the apparatus for producing ethylene, but it is also possible to carry out a collection treatment on the respective components using collection devices in other plants different from the apparatus for producing ethylene instead of carrying out a collection treatment on the product obtained through the cracking and reforming reaction using the product collection device 2 in the apparatus for producing ethylene.

In addition, in the hydrogenation reaction device 31 (hydrogenation reaction step), only a part of the feedstock oil (light thermally-cracked heavy oil) is partially hydrogenated, but all of the feedstock oil may be partially hydrogenated using the hydrogenation reaction device 31 (hydrogenation reaction step).

In addition, as the hydrogen used in the hydrogenation reaction device 31 (hydrogenation reaction step), hydrogen obtained using a well-known method for producing hydrogen may be used instead of the hydrogen collected using the hydrogen collection unit 10.

EXAMPLES

Hereinafter, the present invention will be more specifically described based on examples and comparative examples but the present invention is not limited to these examples.

[Method for Producing Hydrogenated Oil of Feedstock Oil] (Preparation of Catalyst for Hydrogenation Treatment)

Water glass No. 3 was added to 1 kg of an aqueous solution of sodium aluminate having a concentration of 5% by mass and the components were put into a container held at 70° C. A solution obtained by adding an aqueous solution of titanium sulfate (IV) (24% by mass in terms of the content of $TiO_2$) to 1 kg of an aqueous solution of aluminum sulfate having a concentration of 2.5% by mass was prepared in another container held at 70° C. and this solution was added dropwise to an aqueous solution including the sodium aluminate for 15 minutes. The amounts of the water glass and the aqueous solution of titanium sulfate were adjusted so as to obtain predetermined contents of silica and titania.

A point in time when the pH of the mixed solution fell in a range of 6.9 to 7.5 was set as an end point, and the obtained slurry-form product was filtered through a filter, thereby obtaining a cake-form slurry. The cake-form slurry was moved to a container equipped with a reflux condenser, 300 ml of distilled water and 3 g of an aqueous solution of 27% ammonia were added, and were heated and stirred at 70° C. for 24 hours. The stirred slurry was put into a kneading apparatus, was heated at 80° C. or higher, and was kneaded while removing moisture, thereby obtaining a clay-form kneaded substance.

The obtained kneaded substance was extracted into a cylinder shape having a diameter of 1.5 mm using an extruder, was dried at 110° C. for 1 hour, and then was fired at 550° C., thereby obtaining a shaped carrier. The obtained shaped carrier was taken as much as 300 g and was soaked with a soaking solution, which was prepared by adding molybdic anhydride, cobalt (II) nitrate hexahydrate, and phosphoric acid (having a concentration of 85%) to 150 ml of distilled water and adding malic acid until the components were dissolved, through spraying.

The amounts of the molybdic anhydride, the cobalt (II) nitrate hexahydrate, and the phosphoric acid used were adjusted so as to obtain a predetermined support amount. A specimen soaked with a soaking solution was dried at 110° C. for 1 hour and then was fired at 550° C., thereby obtaining a catalyst A. In the catalyst A, the content of $SiO_2$ was 1.9% by mass and the content of $TiO_2$ was 2.0% by mass in terms of the carrier, and the amount of $MoO_3$ supported was 22.9% by mass, the amount of CoO supported was 2.5% by mass, and the amount of $P_2O_5$ supported was 4.0% by mass in terms of the catalyst.

(Distillation and Separation of Thermally-Cracked Heavy Oil and Removal of DCPDs)

Only the light component was separated from a thermally-cracked heavy oil obtained from the apparatus for producing ethylene through a distillation operation, thereby preparing a thermally-cracked heavy oil A. A thermally-cracked heavy oil B was prepared by collecting an unreacted oil produced as a byproduct when a petroleum resin was produced from a lighter heavy oil fraction. A thermally-cracked heavy oil C was also a thermally-cracked heavy oil obtained from the apparatus for producing ethylene but had a higher content of the DCPDs compared with the thermally-cracked heavy oil A and the thermally-cracked heavy oil B. A thermally-cracked heavy oil D and a thermally-cracked heavy oil E were prepared by carrying out a thermal treatment and distillation on the thermally-cracked heavy oil C and removing the DCPDs.

A thermally-cracked heavy oil F was prepared by carrying out a hydrogenation treatment on the thermally-cracked heavy oil C as described below. That is, a commercially available palladium-alumina catalyst (20 ml) was loaded into a fixed-bed continuous circulation-type reaction apparatus. Next, the pressure was increased up to 3 MPa while feeding hydrogen at 8 NL/H. Next, the temperature rise rate was set to 40° C./H and the temperature was increased up to 150° C. This state was held for 10 hours and the reduction of the catalyst was carried out.

After that, the thermally-cracked heavy oil C was used as the feedstock oil and the hydrogenation treatment was carried out at a reaction temperature of 70° C., LHSV=6.0 $h^{-1}$, a hydrogen oil ratio of 200 NL/L, and a pressure of 3 MPa, thereby obtaining a thermally-cracked heavy oil F. The characteristics of the respective thermally-cracked heavy oils and the contents of the DCPDs are described in Table 1.

(Hydrogenation Reaction of Thermally-Cracked Heavy Oil)

The catalyst A was loaded into a fixed-bed continuous circulation-type reaction apparatus and, first, the preliminary sulfurization of the catalyst was carried out. That is, to a fraction (preliminary sulfurization feedstock oil) corresponding to a straight distillation-based light oil having a density at 15° C. of 0.8516 g/ml, an initial boiling point of 231° C. and a finishing boiling point of 376° C. in a distillation test, a content of a sulfur component of 1.18% by mass in terms of a sulfur atom on the basis of the mass of the preliminary sulfurization feedstock oil, and a hue of L1.5, 1% by mass of DMDS in terms of the mass of the fraction was added, and the mixture was continuously supplied to the catalyst A for 48 hours. After that, the thermally-cracked heavy oil A described in Table 1 was used as the feedstock oil and a hydrogenation treatment was carried out at a reaction temperature of 300° C., LHSV=1.0 $h^{-1}$, a hydrogen oil ratio of 500 NL/L, and a pressure of 3 MPa. This reaction could be continued at least for one week. The characteristics of the obtained hydrogenated thermally-cracked heavy oil A-1 are described in Table 2.

In addition, the thermally-cracked heavy oil F described in Table 1 was used as the feedstock oil and a hydrogenation treatment was carried out at a reaction temperature of 300° C., LHSV=1.0 $h^{-1}$, a hydrogen oil ratio of 500 NL/L, and a pressure of 3 MPa. This reaction could be continued at least for one week. The characteristics of the obtained hydrogenated thermally-cracked heavy oil F-1 are described in Table 2.

When the thermally-cracked heavy oil C described in Table 1 was used as the feedstock oil and a hydrogenation treatment was carried out at a reaction temperature of 300° C., LHSV=1.0 $h^{-1}$, a hydrogen oil ratio of 500 NL/L, and a pressure of 3 MPa, the pressure difference in the catalyst layer began to increase when 24 hours passed from the initiation of oil permeation and the operation became impossible. After the pressure difference was relieved, a large amount of coke was confirmed in the catalyst layer. It was confirmed that, in fractions containing a large amount of DCPDs, the stable partial hydrogenation treatment was not possible due to the generation of coke which was considered to be caused by the polarization of CPDs and an olefin compound.

TABLE 1

| Name | | Thermally-cracked heavy oil A | Thermally-cracked heavy oil B | Thermally-cracked heavy oil C | Thermally-cracked heavy oil D | Thermally-cracked heavy oil E | Thermally-cracked heavy oil F |
|---|---|---|---|---|---|---|---|
| Density, g/ml (15° C.) | | 0.9903 | 0.8827 | 0.9385 | 0.889 | 0.901 | 0.9305 |
| Kinematic viscosity, $mm^2/s$ (40° C.) | | 1.6010 | 0.8153 | 1.317 | 0.875 | 0.956 | 1.31 |
| Sulfur component, % by mass | | 0.025 | 0.0013 | 0.02 | 0.003 | 0.008 | 0.0156 |
| Distillation characteristics, ° C. | IBP | 194 | 163 | 146 | 147 | 145 | 146 |
| | T10 | 211 | 167 | 155 | 160 | 162 | 154 |
| | T90 | 256 | 176 | 212 | 183 | 177 | 207 |
| | EP | 291 | 203 | 284 | 275 | 271 | 283 |
| Saturated components, % by mass | | 0.8 | 7.2 | 1.1 | 6.7 | 5.2 | 14.3 |
| Aromatic components, % by mass | | 98.4 | 91.6 | 83.9 | 91 | 88 | 83.7 |
| Bicyclic or more aromatic components, % by mass | | 76.6 | 3.7 | 15 | 5 | 7.5 | 14 |
| DCPDs, % by mass | | ≤1 | ≤1 | 15 | 2 | 6 | 1 |

TABLE 2

| | Name | |
|---|---|---|
| | Hydrogenated thermally-cracked heavy oil A-1 | Hydrogenated thermally-cracked heavy oil F-1 |
| Density, g/ml (15° C.) | 0.9498 | 0.9141 |
| Kinematic viscosity, mm$^2$/s (40° C.) | 1.616 | 1.303 |
| Sulfur component, % by mass | 0.0003 | 0.0001 |
| Distillation characteristics, ° C.   IBP | 192 | 145 |
| T10 | 201 | 150 |
| T90 | 252 | 201 |
| EP | 314 | 288 |
| Saturated components, % by mass | 7.9 | 16.7 |
| Aromatic components, % by mass | 91.8 | 82.5 |
| Bicyclic or more aromatic components, % by mass | 4.6 | 1.0 |

The distillation characteristics in Tables 1 and 2 were respectively measured according to "Testing Method For Distillation Of Petroleum Products" described in JIS K 2254. In addition, the density at 15° C. in Table 1 was measured according to "Testing Method For Distillation Of Petroleum Products" described in JIS K 2254, the kinematic viscosity at 40° C. was measured according to "Crude Petroleum And Petroleum Products-Determination Of Kinematic Viscosity And Calculation Method For Viscosity Index Of Crude Oil And Petroleum Products" described in JIS K 2283, and the content of sulfur was measured according to "Crude Petroleum And Petroleum Products-Determination Of Sulfur Content" described in JIS K 2541, respectively.

In addition, the respective compositions in Tables 1 and 2 were computed by carrying out a mass analysis (apparatus: manufactured by JEOL Ltd., JMS-700) through an EI ionization method on saturated components and aromatic components obtained through silica gel chromate fractionation and carrying out the type analysis of hydrocarbons according to ASTM D2425 "Standard Test Method for Hydrocarbon Types in Middle Distillates by Mass Spectrometry".

The amounts of the DCPDs in Table 1 were analyzed using a gas chromatography. The total amount of the directly-detected DCPDs and the CPDs detected by cracking the DCPDs using an injection unit was considered as the content of the DCPDs.

[Method for Producing Olefin and Aromatic Hydrocarbon]

[Preparation Example 1 of Catalyst for Producing Olefin and Monocyclic Aromatic Hydrocarbon]

"Preparation of Phosphorous-Containing Proton-Type MFI Zeolite"

A solution (A) made up of 1706.1 g of sodium silicate (J silicate soda No. 3, SiO$_2$: 28% by mass to 30% by mass, Na: 9% by mass to 10% by mass, the balance of water, manufactured by Nippon Chemical Industrial Co., Ltd.) and 2227.5 g of water and a solution (B) made up of 64.2 g of Al$_2$(SO$_4$)$_3$.14 to 18H$_2$O (special grade chemical, manufactured by Wako Pure Chemical Industries, Ltd.), 369.2 g of tetrapropylammonium bromide, 152.1 g of H$_2$SO$_4$ (97% by mass), 326.6 g of NaCl, and 2975.7 g of water were prepared respectively.

Next, while the solution (A) was stirred at room temperature, the solution (B) was slowly added to the solution (A).

The obtained mixture was vigorously stirred for 15 minutes using a mixer, a gel was crushed and thus was put into a homogeneous fine milky state.

Next, the mixture was put into a stainless steel autoclave and a crystallization operation was carried out under the self-pressure under conditions in which the temperature was set to 165° C., the time was set to 72 hours, and the stirring rate was set to 100 rpm. After the end of the crystallization operation, the product was filtered so as to collect the solid product and washing and filtration were repeated 5 times using approximately 5 liters of deionized water. A solid substance obtained through filtration was dried at 120° C. and, furthermore, was fired at 550° C. for 3 hours under air circulation.

As a result of an X-ray diffraction analysis (instrument name: Rigaku RINT-2500V), the obtained fired substance was confirmed to have an MFI structure. In addition, the SiO$_2$/Al$_2$O$_3$ ratio (molar ratio) obtained through a fluorescent X-ray analysis (instrument name: Rigaku ZSX101e) was 65. In addition, the content of an aluminum element contained in the lattice skeleton computed from the result was 1.3% by mass.

Next, an aqueous solution of 30% by mass of ammonium nitrate was added at a proportion of 5 mL per gram of the obtained fired substance, the mixture was heated and stirred at 100° C. for 2 hours, then, was filtered and washed with water. This operation was repeated 4 times and then the mixture was dried at 120° C. for 3 hours, thereby obtaining an ammonium-type MFI zeolite. After that, firing was carried out at 780° C. for 3 hours, thereby obtaining a proton-type MFI zeolite.

Next, 30 g of an aqueous solution of diammonium hydrogen phosphate was soaked into 30 g of the obtained proton-type MFI zeolite so that 2.0% by mass of phosphorous (a value when the total mass of the proton-type MFI zeolite was set to 100% by mass) was supported and was dried at 120° c. After that, the zeolite was fired at 780° C. for 3 hours under air circulation, thereby obtaining a phosphorous-containing proton-type MFI zeolite. In order to exclude the influence on the initial activity of the obtained catalyst, a hydrothermal treatment was carried out in an environment of a treatment temperature of 650° C., a treatment time of 6 hours, and 100% by mass of water vapor.

"Preparation of Phosphorous-Containing Proton-Type BEA Zeolite"

A first solution was prepared by dissolving 59.1 g of silicic acid (SiO$_2$: 89% by mass) in 202 g of an aqueous solution of tetraethylammnoium hydroxide (40% by mass). The first solution was added to a second solution prepared by dissolving 0.74 g of an Al pellet and 2.69 g of sodium hydroxide in 17.7 g of water. The first solution and the second solution were mixed together as described above, thereby obtaining a reaction mixture having a composition (in terms of the molar ratio of an oxide) of 2.4Na$_2$O-20.0 (TEA)$_2$-Al$_2$O$_3$-64.0SiO$_2$-612H$_2$O.

This reaction mixture was put into a 0.3 L autoclave and was heated at 150° C. for 6 days. In addition, the obtained product was separated from the parent liquid and was washed with distilled water.

As a result of an X-ray diffraction analysis (instrument name: Rigaku RINT-2500V) of the obtained product, the product was confirmed to be a BEA-type zeolite from the XRD pattern.

After that, ions were exchanged using an aqueous solution of ammonium nitrate (30% by mass), the BEA-type zeolite was fired at 550° C. for 3 hours, thereby obtaining a proton-type BEA zeolite.

"Preparation of Catalyst Including Phosphorous-Containing Proton-Type BEA Zeolite"

Next, 30 g of an aqueous solution of diammonium hydrogen phosphate was soaked into 30 g of the proton-type BEA zeolite so that 2.0% by mass of phosphorous (a value when the total mass of the crystalline aluminosilicate was set to 100% by mass) was supported and was dried at 120° c. After that, the zeolite was fired at 780° C. for 3 hours under air circulation, thereby obtaining a catalyst containing the proton-type BEA zeolite and phosphorous. In order to exclude the influence on the initial activity of the obtained catalyst, a hydrothermal treatment was carried out in an environment of a treatment temperature of 650° C., a treatment time of 6 hours, and 100% by mass of water vapor. After that, a pressure of 39.2 MPa (400 kgf) was applied to the hydrothermal deterioration treatment catalyst obtained by mixing 9 parts of the hydrothermally-treated phosphorous-containing proton-type MFI zeolite with 1 part of the phosphorous-supported proton-type BEA zeolite that had been, similarly, hydrothermally treated so as to carry out tablet compression and the catalyst was coarsely crushed so as to have sizes in a range of 20 mesh to 28 mesh, thereby obtaining a granular body of a catalyst B.

Examples 1 to 6 and Comparative Examples 1 and 2

(Production of Olefin and Aromatic Hydrocarbon)

Individual feedstock oils described in Table 3 were brought into contact with and were reacted with the corresponding catalyst using a circulation-type reaction apparatus having a reactor loaded with the catalyst B (10 ml) under a condition in which the reaction temperature was set to 550° C., the reaction pressure was set to 0.1 MPaG, and LHSV was set to 1 h$^{-1}$. The feedstock oils used and the catalyst were combined together so as to produce Examples 1 to 6 and Comparative Examples 1 and 2 as described in Table 3. When each of the feedstock oils and the catalyst were brought into contact with and were reacted with each other, nitrogen was introduced into the feedstock oil as a diluting agent so as to obtain a volume ratio of 1:1.

product having 4 or less carbon atoms. In the examples and the comparative examples, the portions required to make the total yield reach 100% were accounted for by a naphtha component (which had approximately 5 to 8 carbon atoms and was not an aromatic hydrocarbon), CPDs that had become heavy and could not be collected, coke, and the like.

From the results described in Table 3, it was found that, in Examples 1 to 6 in which the thermally-cracked heavy oil having predetermined characteristics was used as the feedstock oil, in contrast to Comparative Example 1 in which the thermally-cracked heavy oil having a large content of the DCPDs was used as the feedstock oil, olefins having 2 to 4 carbon atoms and monocyclic aromatic hydrocarbons having 6 to 8 carbon atoms (benzene, toluene, and xylene) could be produced with a favorable yield. In addition, in Comparative Example 2 in which coke was excessively generated on the catalyst, the reaction tube was blocked in the middle, and thus the evaluation could not be continued to the end.

Therefore, in Examples 1 to 6 of the present invention, it was confirmed that olefins and BTX could be efficiently produced from the thermally-cracked heavy oil having a small content of the DCPDs which was obtained from the apparatus for producing ethylene.

In addition, when Examples 3 to 6 were compared together, it was confirmed that olefins having 2 to 4 carbon atoms and monocyclic aromatic hydrocarbons having 6 to 8 carbon atoms (benzene, toluene, and xylene) could be more efficiently produced using a feedstock oil having a small content of the DCPDs. With a feedstock having a large content of the DCPDs, the yield of a target substance was decreased as described in Comparative Example 1 and, furthermore, the long-term operation became difficult as described in Comparative Example 2.

Example 7

The liquid product obtained in Example 2 was distilled and only the heavy fractions (bottom) were collected. The

TABLE 3

| | | Example 1 | Example 2 | Example 3 | Example 4 | Example 5 | Example 6 | Comparative Example 1 | Comparative Example 2 |
|---|---|---|---|---|---|---|---|---|---|
| | Feedstock | Thermally-cracked heavy oil B | Hydrogenated thermally-cracked heavy oil A-1 | Thermally-cracked heavy oil B | Thermally-cracked heavy oil D | Thermally-cracked heavy oil E | Hydrogenated thermally-cracked heavy oil F-1 | Thermally-cracked heavy oil C | Thermally-cracked heavy oil C |
| | Reaction time (h) | 24 | 24 | 12 | 12 | 12 | 24 | 12 | 15 |
| Yield | Olefin | 4 | 2 | 3 | 2 | 2 | 6 | ≤1 | Reaction tube blocked |
| (% by mass) | Gas other than olefin | 3 | 4 | 6 | 6 | 6 | 9 | ≤1 | |
| | BTX | 33 | 30 | 44 | 45 | 38 | 46 | 25 | |
| | Heavy component | 59 | 63 | 46 | 46 | 42 | 36 | 35 | |

Reactions were caused under the above-described conditions for the times described in Table 3 so as to produce olefins and BTX and the compositional analyses of the products were carried out through an FID gas chromatograph directly coupled to the reaction apparatus so as to evaluate the catalyst activities. The evaluation results are described in Table 3. Here, the olefin refers to an olefin having 2 to 4 carbon atoms, BTX refers to an aromatic compound having 6 to 8 carbon atoms, the heavy component refers to a product heavier than BTX, and the gas other than the olefin refers to substances other than the olefin in the collected liquid and the thermally-cracked heavy oil A were mixed together at a ratio of 2:1, again, were hydrogenated under the same conditions as the conditions in which the hydrogenated thermally-cracked heavy oil A-1 was obtained, and then the catalyst activities were evaluated under the same conditions as in Example 2. The results are described in Table 4. From the results described in Table 4, it was confirmed that it was possible to more efficiently produce olefins and BTX from the thermally-cracked heavy oil having a small content of the DCPDs which was obtained from the apparatus for producing ethylene by repeatedly using the heavy oil as the feedstock.

TABLE 4

|  |  | Example 7 |
|---|---|---|
| Feedstock |  | Hydrogenated substance of mixed oil of bottom corresponding to Example 2 and thermally-cracked heavy oil A |
| Reaction time (h) |  | 24 |
| Yield (% by mass) | Olefin | 3 |
|  | Gas other than olefin | 5 |
|  | BTX | 30 |
|  | Heavy component | 61 |

INDUSTRIAL APPLICABILITY

The present invention relates to a method for producing an olefin and a monocyclic aromatic hydrocarbon and an apparatus for producing ethylene. According to the present invention, it is possible to produce BTX with higher production efficiency and to efficiently produce olefins as well.

REFERENCE SIGNS LIST

1 CRACKING FURNACE
2 PRODUCT COLLECTION DEVICE
26 HEATING FURNACE (DICYCLOPENTADIENE REMOVAL DEVICE)
27 HEATING FURNACE (DICYCLOPENTADIENE REMOVAL DEVICE)
31 HYDROGENATION REACTION DEVICE
33 CRACKING AND REFORMING REACTION DEVICE (FIXED-BED REACTOR)
37 RECYCLING PATH (RECYCLING MEANS)

The invention claimed is:

1. A method for producing an olefin and a monocyclic aromatic hydrocarbon, comprising:
   thermally cracking a feedstock in a steam cracker to obtain a feedstock oil comprising a dicyclopentadienes content and having a 90 volume % distillation temperature of 220-390° C.;
   treating the feedstock oil to reduce the dicyclopentadienes content in the feedstock oil to obtain a treated feedstock oil comprising a dicyclopentadienes content of 10% by weight or less; and
   reacting the treated feedstock oil by contact with a cracking and reforming catalyst containing crystalline aluminosilicate to obtain a product comprising an olefin having 2 to 4 carbon atoms and a monocyclic aromatic hydrocarbon having 6 to 8 carbon atoms;
   wherein
   treating the feedstock oil comprises heating the feedstock oil to convert dicyclopentadiene to two cyclopentadiene monomers, or selectively hydrogenating an olefin portion included in the dicyclopentadiene, and
   the thermally cracking is carried out at a temperature of 770-850° C.

2. The method according to claim 1, further comprising:
   partially hydrogenating part or all of the treated feedstock oil before reacting the treated feedstock oil.

3. The method according to claim 2,
   wherein, the partially hydrogenating part or all of the treated feedstock oil is conducted at a hydrogen partial pressure in a range of 1 MPa to 9 MPa, a hydrogenation temperature in a range of 150° C. to 400° C., and in the presence of a catalyst comprising at least one metal selected from Group 6 metals in the periodic table at an amount of 10% by mass to 30% by mass, at least one metal selected from Groups 8 to 10 metals in the periodic table at an amount of 1% by mass to 7% by mass, and an inorganic carrier containing aluminum oxide.

4. The method according to claim 1, further comprising:
   returning a heavy fraction having 9 or more carbon atoms from the product to the reacting step.

5. The method according to claim 1,
   wherein, in reacting the treated feedstock oil, two or more fixed-bed reactors are used and reacting the treated feedstock oil and reproduction of the cracking and reforming catalyst are repeated while the reactors are periodically switched.

6. The method according to claim 1,
   wherein the crystalline aluminosilicate contained in the cracking and reforming catalyst includes a medium-pore zeolite and/or a large-pore zeolite as a main component.

7. The method according to claim 1,
   wherein the cracking and reforming catalyst contains phosphorous.

* * * * *